US007751077B2

(12) United States Patent
Fujii et al.

(10) Patent No.: US 7,751,077 B2

(45) Date of Patent: Jul. 6, 2010

(54) IMAGE RECORDING SYSTEM AND PROGRAM

(75) Inventors: Shuhji Fujii, Osaka (JP); Shinji Kato, Osaka (JP); Syoichiro Yoshiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 754 days.

(21) Appl. No.: 11/635,602

(22) Filed: Dec. 8, 2006

(65) Prior Publication Data

US 2007/0139685 A1 Jun. 21, 2007

(30) Foreign Application Priority Data

Dec. 21, 2005 (JP) ............................ 2005-367970

(51) Int. Cl.
*G06F 3/12* (2006.01)
*G06K 15/00* (2006.01)

(52) U.S. Cl. .................... 358/1.15; 358/1.13; 358/1.18; 358/1.9

(58) Field of Classification Search .................. 358/1.1, 358/1.2, 1.3, 1.4, 1.5, 1.9, 1.12, 1.13, 1.14, 358/1.15, 1.18, 407, 468; 347/2, 3, 5, 14, 347/23; 399/1, 8, 9; 355/79, 89, 46, 19
See application file for complete search history.

(56) References Cited

U.S. PATENT DOCUMENTS 4,797,706 A * 1/1989 Sugishima et al. .......... 358/300
5,150,167 A 9/1992 Gonda et al.
6,930,798 B1 * 8/2005 Kaneko ...................... 358/1.9

FOREIGN PATENT DOCUMENTS

| | | | |
|---|---|---|---|
| JP | 1-112275 | A | 4/1989 |
| JP | 08-224946 | | 9/1996 |
| JP | 8-305221 | A | 11/1996 |
| JP | 8-336002 | A | 12/1996 |
| JP | 10-329391 | | 12/1998 |
| JP | 2001-195212 | | 7/2001 |
| JP | 2002-103750 | | 4/2002 |
| JP | 2004-078267 | | 3/2004 |

* cited by examiner

*Primary Examiner*—Dov Popovici
(74) *Attorney, Agent, or Firm*—Birch, Stewart, Kolasch & Birch, LLP

(57) ABSTRACT

An image recording system includes two image recording apparatuses each capable of recording images independently. A color image recording apparatus is disposed with a bypass transporting path apparatus. A transporting path connecting apparatus is disposed between the front of a monochrome image recording apparatus and the back of the color image recording apparatus. A final processing apparatus that is common to the color and monochrome image recording apparatuses is disposed in the front of the color image recording apparatus. This system includes a process switching portion that switches an image recording process executed by one image recording apparatus to a substitute image recording process of the other image recording apparatus and a switching determining portion that determines whether the switching is executed by the process switching portion, depending on whether a predetermined condition is satisfied.

20 Claims, 16 Drawing Sheets

IMAGE RECORDING SYSTEM AND PROGRAM

CROSS-NOTING PARAGRAPH

This Non-provisional application claims priority under 35 U.S.C. §119 (a) on Patent Application No. 2005-367970 filed in JAPAN on Dec. 21, 2005, the entire contents of which are hereby incorporated herein by reference.

FIELD OF THE INVENTION

The present invention relates generally to an image recording system and a program, and more particularly, to an image recording system including two image recording apparatuses each capable of recording independently images and a program to be incorporated executably in the system.

BACKGROUND OF THE INVENTION

Today, copying machines, facsimile machines, printing apparatuses, etc., are indispensable for paper work in offices. These copying machines, facsimile machines, printing apparatuses, etc., are each configured based on an image recording apparatus. Recently, an image recording apparatus is drawing attention as a multi-function peripheral incorporating all the functions of a copying machine, a facsimile machine, a printing apparatus, etc. The image recording apparatus includes as a basic function a function of recording an image such as characters and charts onto a recording medium such as recording paper in the form of a sheet. Recording of an image can be recording of a monochrome image and recording of a color image.

Recently, due to the increase of the amount of the paperwork, improvement of the processing speed of the image recording apparatus is demanded to the above image recording apparatus. Because an image recording apparatus is an apparatus that records an image, the improvement of the processing speed is, in other words, improvement of the speed of recording onto a recording paper sheet that is a recording medium and ejecting the paper sheet. Therefore, improvement of the number of sheets of recording paper that are recorded and ejected per unit time is demanded.

In response to such demand, in addition to a method of facilitating the improvement of the processing speed of the image recording apparatus itself, a method of improving the processing speed comprehensively by using a plurality of image recording apparatuses can be contemplated. To cope with the above demand in such a viewpoint, various proposals have been made (see, for example, Japanese Laid-Open Patent Publication Nos. H1-112275 and H8-305221).

Japanese Laid-Open Patent Publication No. H1-112275 describes an image forming apparatus that includes both of a color image forming apparatus and a monochrome electronic photograph apparatus.

Japanese Laid-Open Patent Publication No. H8-305221 describes a technique that facilitates the improvement of the processing speed by configuring a color printing apparatus using a plurality of color image forming apparatuses and adapting the color printing apparatus to configure the color image forming apparatuses to output continuously a large amount of prints and eject the prints at a high speed placing the prints in order of page number thereof on bins in a common sorter by controlling the printing process in each color image forming apparatus. The color printing apparatus described in Japanese Laid-Open Patent Publication No. H8-305221 operates two color image forming apparatuses simultaneously to improve the speed of the processing thereof.

Generally, an image recording apparatus is caused to process at one time one image recording job that executes a series of image recording processes, that is, one image recording job that executes image recording consecutively of images each of which is independent for each page onto a plurality of recording paper sheets in order of page number. In this regard, same procedure as above is also taken in the color printing apparatus described in Japanese Laid-Open Patent Publication No. H8-305221 that is configured using a plurality of color image forming apparatuses to facilitate the improvement of the processing speed thereof. That is, the color printing apparatus described in Japanese Laid-Open Patent Publication No. H8-305221 processes one image recording job at one time. The apparatus facilitates improvement of the processing speed thereof by processing in a distributed manner using a plurality of color image forming apparatuses. Therefore, the plurality of image forming apparatuses configuring such a color printing apparatus must be all the same type of apparatuses, that is, color image forming apparatuses.

However, for conventional image recording systems each configured by a plurality of image recording apparatuses in addition to those described in Japanese Laid-Open Patent Publication Nos. H1-112275 and H8-305221, time from setting an original document and pressing down an operational button ("copy" button or "start" button) to outputting of a sheet that is printed first as a recorded item into a containing portion (FCOT: First Copy Time) and the case where the image recording process can not be continued temporarily or until repairing is completed are not considered. Therefore, for a conventional image recording system, the processing speed is felt to be slow and discomfort is generated.

For example, the image forming apparatus described in Japanese Laid-Open Patent Publication No. H1-112275 includes the color image forming apparatus and the monochrome electronic photograph apparatus, and can record superimposing on a color image obtained by the color image forming apparatus using the monochrome electronic photograph apparatus and operate each of the included apparatuses independently. However, the image forming apparatus is an invention strictly for improving the image quality and can not switch the included apparatuses for each one image recording job. Therefore, the image forming apparatus described in Japanese Laid-Open Patent Publication No. H1-112275 can not execute control to improve FCOT, and substitute printing for the case where the image recording process can not be continued temporarily or until repairing is completed.

The color printing apparatus described in Japanese Laid-Open Patent Publication No. H8-305221 includes the same type of color image forming apparatuses as described above and only facilitates the improvement of the processing speed thereof by processing one image recording job in a distributed manner using the plurality of color image forming apparatuses. Therefore, the color printing apparatus can not facilitate improvement of FCOT and can not execute substitute printing for the case where the image recording process can not be continued temporarily or until repairing is completed.

A technique is also present that, in the case where an image recording process is requested from a personal computer (PC), etc., when the image recording system can not process the requested process, requests substitute processing to another image recording apparatus, etc., that is connected with a network. However, recorded items are distributed at scattered places and labor to retrieving the recorded items is generated.

SUMMARY OF THE INVENTION

The object of the present invention is to provide; an image recording system that includes two image recording apparatuses each capable of recording images independently, can facilitate improvement of FCOT, and can execute substitute printing in the case where the image recording process can not be continued temporarily or until repairing is completed; and a program to be incorporated executably in the system.

More specifically, an object of the present invention is to provide an image recording system that comprises a first and a second image recording apparatuses disposed side by side and each capable of recording images independently, the system comprising a common recorded item containing portion that contains the recorded item outputted from the first image recording apparatus and the recorded item outputted from the second image recording apparatus, the common recorded item containing portion being disposed next to the first image recording apparatus side by side, the system comprising a process switching portion that switches an image recording process executed by one image recording apparatus to a substitute image recording process of the other image recording apparatus and a switching determining portion that determines whether the switching is executed by the process switching portion, depending on whether a predetermined condition is satisfied.

Another object of the present invention is to provide the image recording system, wherein with regard to the first image recording apparatus and the second image recording apparatus, one image recording apparatus is a color image recording apparatus including a monochrome image recording function and the other image recording apparatus is a monochrome image recording apparatus.

Another object of the present invention is to provide the image recording system, wherein the predetermined condition in the switching determining portion includes a condition that the recorded item from the image recording apparatus executing the image recording process arrives at the recorded item containing portion later than the other image recording apparatus.

Another object of the present invention is to provide the image recording system, wherein the predetermined condition in the switching determining portion includes a condition that the recording in one image recording apparatus is able to be continued.

Another object of the present invention is to provide the image recording system, wherein the predetermined condition in the switching determining portion includes a condition that the output of the same recorded item is able to be guaranteed in said other image recording apparatus.

Another object of the present invention is to provide the image recording system, wherein the guarantee of the output of the same recorded item includes that a recording material necessary for the image recording is also able to be supplied to said other image recording apparatus in the same way.

Another object of the present invention is to provide the image recording system, wherein the guarantee of the output of the same recorded item includes that stable operation is able to be guaranteed in said other image recording apparatus.

Another object of the present invention is to provide the image recording system, the predetermined condition in the switching determining portion includes a condition that other print jobs are not in a stagnation situation in said other image recording apparatus.

Another object of the present invention is to provide the image recording system, comprising a process recovering portion that recovers the image recording process from the substitute image recording process in said other image recording apparatus after the process switching portion executes the switching, and a recovery determining portion that determines whether the recovery is executed by the process recovering portion, depending on whether a predetermined condition is satisfied.

Another object of the present invention is to provide the image recording system, wherein the predetermined condition in the recovery determining portion includes a condition that the recorded item from the image recording apparatus executing the image recording process arrives at the recorded item containing portion faster than the substitute image recording process of the other image recording apparatus.

Another object of the present invention is to provide the image recording system, wherein the predetermined condition in the recovery determining portion includes a condition that the output of the same recorded item is able to be guaranteed in the image recording apparatus executing the image recording process.

Another object of the present invention is to provide the image recording system, wherein the guarantee of the output of the same recorded item in the recovery determining portion includes that a recording material necessary for the image recording is also able to be supplied to the image recording apparatus executing the image recording process in the same way.

Another object of the present invention is to provide the image recording system, wherein the guarantee of the output of the same recorded item in the recovery determining portion includes that stable operation is able to be guaranteed in the image recording apparatus executing the image recording process.

Another object of the present invention is to provide the image recording system, comprising a sheet-number detecting portion that detects a number of sheets to be processed with the image recording process, wherein the recovery determining portion obtains a number of remaining sheets to be processed based on the number of sheets detected by the sheet-number detecting portion and wherein the predetermined condition in the recovery determining portion includes a condition that the number of remaining sheets to be processed is equal to or greater than a predetermined number of sheets.

Another object of the present invention is to provide the image recording system, wherein a controlling portion of the first image recording apparatus acts as the process switching portion and the switching determining portion, or the process switching portion and the switching determining portion as well as the process recovering portion and the recovery determining portion, to control a controlling portion of the second image recording apparatus.

Another object of the present invention is to provide the image recording system, wherein controlling portions of the both image recording apparatuses respectively include a monitoring portion that monitors the other image recording apparatus through the controlling portion of the other image recording apparatus, and the process switching portion and the switching determining portion, or the process switching portion and the switching determining portion as well as the process recovering portion and the recovery determining portion.

Another object of the present invention is to provide the image recording system, comprising a common controlling portion incorporated into a housing disposed between the first image recording apparatus and the second image recording apparatus, the common controlling portion acting as the process switching portion and the switching determining portion, or the process switching portion and the switching determining portion as well as the process recovering portion and the recovery determining portion, to control both a controlling portion of the first image recording apparatus and a controlling portion of the second image recording apparatus.

Another object of the present invention is to provide a program to be incorporated in the controlling portion of the first image recording apparatus in the image recording system, the program causing a computer to function as the process switching portion and the switching determining portion, or the process switching portion and the switching determining portion as well as the process recovering portion and the recovery determining portion.

Another object of the present invention is to provide a program to be incorporated in the controlling portions of the both image recording apparatuses in the image recording system, the program causing a computer to function as the process switching portion and the switching determining portion, or the process switching portion and the switching determining portion as well as the process recovering portion and the recovery determining portion.

Another object of the present invention is to provide a program to be incorporated in the common controlling portion in the image recording system, the program causing a computer to function as the process switching portion and the switching determining portion, or the process switching portion and the switching determining portion as well as the process recovering portion and the recovery determining portion.

PREFERRED EMBODIMENTS OF THE INVENTION

Figure 1:
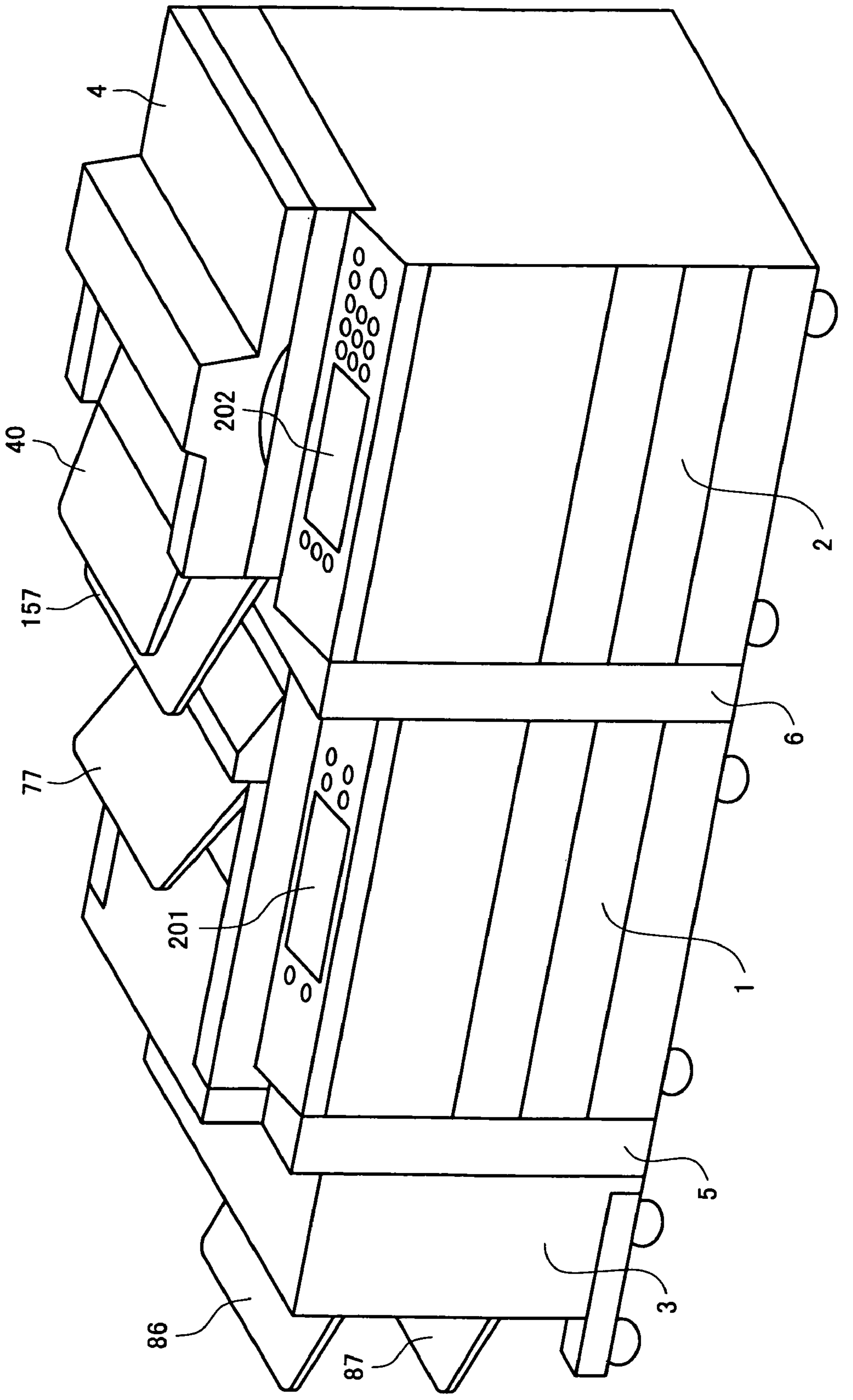
FIG. 1 is a view of the appearance of the configuration of an image recording system according to an embodiment of the present invention.

An image recording system according to the present invention (hereinafter, "the present system") is configured by disposing side by side a first and a second image recording apparatuses each of which can record images independently and is configured by disposing adjacent to the first image recording apparatus (on the opposite side of the side of the second image recording apparatus) a common recorded item containing portion that contains recorded items outputted from the first image recording apparatus and recorded items outputted from the second image recording apparatus. That is, in the present system, the recorded item containing portion, the first image recording apparatus, and the second image recording apparatus are disposed in this order. A housing may be provided between the first image recording apparatus and the second image recording apparatus to connect these apparatuses with each other. Each of the first image recording apparatus and the second image recording apparatus includes a copying function, a printer function, a network printer function, etc., similarly to an ordinary apparatus called "multi-function peripheral" and executes image recording thereof using these functions. However, the apparatuses do not need to include all of these functions.

The present system includes a process switching portion and a switching determining portion. The process switching portion is a portion that switches an image recording process executed by one image recording apparatus to a substitute image recording process of the other image recording apparatus. The switching determining portion is a portion that determines whether the switching is executed by the process switching portion, depending on whether a predetermined condition is satisfied.

If the switching determining portion determines to execute the switching, by switching an apparatus to execute an image recording process by the process switching portion, improvement of FCOT can be facilitated and substitute printing for the case where the image recording process can not be continued temporarily or until repairing is completed can be executed. The substitute image recording process executed according to the present invention is different from a process that requests substitution to another image recording apparatus through a network and, as a result of the image recording, all of recorded items are contained in the recorded item containing portion of the present system and no labor is necessary to go to distributed places to retrieve the recorded items.

The present system will be described with referring to FIGS. 1 to 14 and taking an example of the case where the first image recording apparatus is a color image recording apparatus having a monochrome image recording function and the second image recording apparatus is a monochrome image recoding apparatus. However, in the cases other than the above case, the present invention is preferably applicable where the first image recording apparatus and the second image recording apparatus respectively have performance such as outputting speeds that are different from each other or where those apparatuses respectively have functions different from those of each other such as color or monochrome, ability/disability of recording to a hard disk (HDD), presence or absence of a facsimile function. To be exemplified referring to FIGS. 15 and 16, the present invention is applicable even to a system with those apparatuses exchanged with each other, that is, a system configured by the second image recording apparatus that is color image recording apparatus having a monochrome image recording function and the first image recording apparatus that is a monochrome image recording apparatus and, in this case, advantages such as that FCOT of the monochrome image recording apparatus becomes shorter can be expected. The present invention is surely applicable even to the case where the first image recording apparatus and the second image recording apparatus are completely of the same type.

Figure 2:
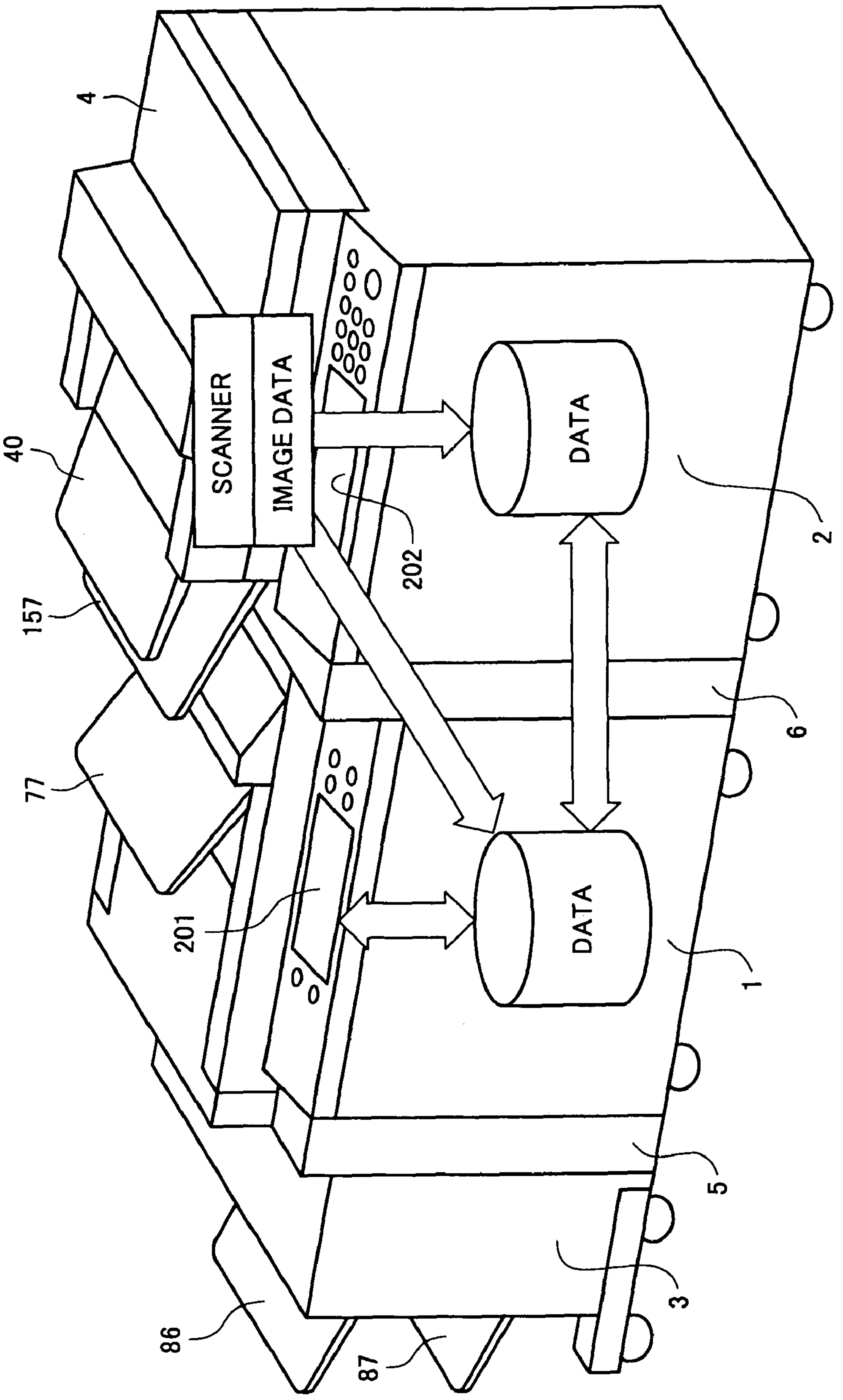
FIG. 2 is an explanatory schematic view of exchanging of image data in the image recording system of FIG. 1.
Figure 3:
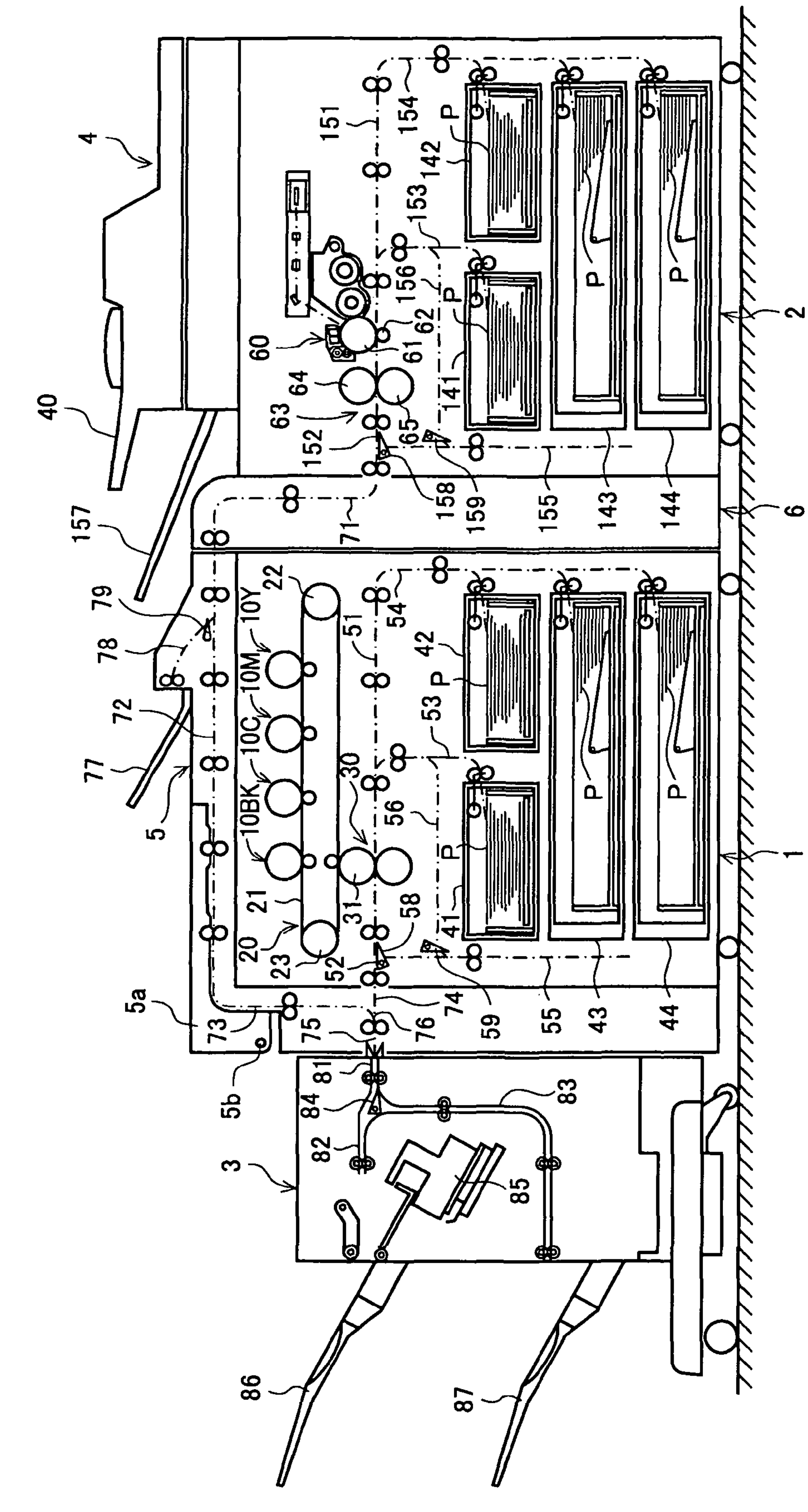
FIG. 3 is a schematic cross-sectional view of an example of the configuration of the image recording system of FIG. 1.
Figure 4:
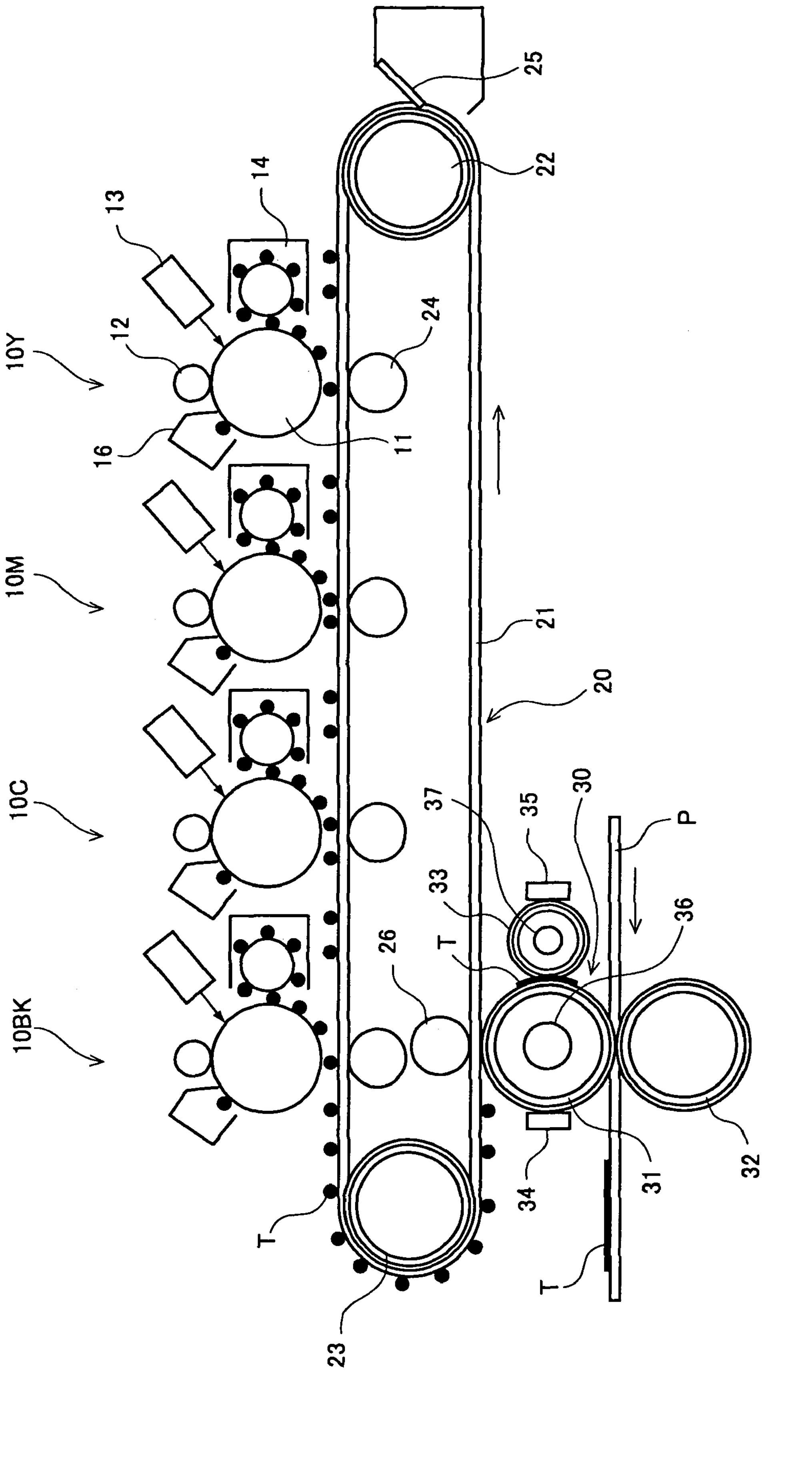
FIG. 4 is an enlarged view of a color image forming portion in the image recording system of FIG. 3.

FIG. 1 is a view of the appearance of the configuration of an image recording system according to an embodiment of the present invention. FIG. 2 is an explanatory schematic view of exchanging of image data in the image recording system of FIG. 1. FIG. 3 is a schematic cross-sectional view of an example of the configuration of the image recording system of FIG. 1. FIG. 4 is an enlarged view of a color image forming portion in the image recording system of FIG. 3.

The present system exemplified in FIGS. 1 to 4 comprises a color image recording apparatus 1 disposed on the center part, a final processing apparatus 3 disposed on the front side (on the left in the figure) of the color image recording apparatus 1, a monochrome image recording apparatus 2 disposed in the back side (on the right in the figure) of the color image recording apparatus 1, and a color image reading apparatus (color scanner) 4 mounted on the upper portion of the monochrome image recording apparatus 2.

The present system is exemplified assuming that the processing speed of the color image recording apparatus 1 used in the embodiment is about 70 sheets/min. and, in contrast, the processing speed of the monochrome image recording apparatus 2 is about 110 sheets/min. That is, for the color image recording apparatus 1 and the monochrome image recording apparatus 2 that are the two image recording apparatuses disposed fore and aft, the color image recording apparatus 1 having the slower processing speed is disposed in front and the monochrome image recording apparatus 2 having the faster processing speed is disposed in the back.

A bypass transporting path apparatus 5 having an inversed L-shape as a side view is disposed such that the apparatus 5 covers over the color image recording apparatus 1 from the front portion to the upper portion of the color image recording apparatus 1. A transporting path connecting apparatus 6 having a housing shape is disposed between the front portion of the monochrome image recording apparatus 2 and the back portion of the color image recording apparatus 1. An upper containing tray 77 is provided above the bypass transporting path apparatus 5. The front portion of the monochrome image recording apparatus 2 is connected with the back portion of the color image recording apparatus 1 through the transporting path connecting apparatus 6. The front portion of the monochrome image recording apparatus 2 is connected with the back portion of the final processing apparatus 3 through the bypass transporting path apparatus 5.

That is, as shown in FIG. 3, the present system exemplified herein is configured by connecting in series from the front to the back the final processing apparatus 3, the bypass transporting path apparatus 5, the color image recording apparatus 1, the transporting path connecting apparatus 6, and the monochrome image recording apparatus 2. The upper portion of the color image recording apparatus 1 is occupied by the bypass transporting path apparatus 5 having the upper containing tray 77. The upper portion of the monochrome image recording apparatus 2 has no bypass transporting path apparatus and is occupied by the color image reading apparatus 4.

As exemplified in FIG. 2, image data read by the color scanner 4 from an original document mounted on an original document mounting tray 40 and fed by automatic original document feeding or image data inputted from an external PC is stored temporarily in a data storing area in the color image recording apparatus 1 or the monochrome image recording apparatus 2, an image recording process is executed, and, when necessary, a substitute image recording process according to the present invention is executed. A monochrome-side operating panel 202 is disposed on the reader's side in the upper portion of the monochrome image recording apparatus 2 and a color-side operating panel 201 is disposed on the reader's side in the upper portion of the color image recording apparatus 1.

As to the embodiment, no more is described than that an ordinary color scanner is used as a color image reading apparatus 4 and description concerning the configuration of the color image reading apparatus 4 is omitted. Other configurations may be applicable such as that the color image reading apparatus 4 is provided on the color image recording apparatus 1 and a monochrome image reading apparatus is provided on the monochrome image recording apparatus 2.

The present system may also be configured by disposing the above color image recording apparatus 1 and monochrome image recording apparatus 2 side by side, providing a recorded item containing portion (or common containing portion) that contains commonly recording media that are recorded (recorded items) to each image recording apparatus, and providing a dedicated containing portion that contains dedicatedly recorded items of the monochrome image recording apparatus 2 (exemplified with the upper containing tray 77 provided above the bypass transporting path apparatus 5) to the above monochrome image recording apparatus 2 such that the dedicated containing portion and the above common containing portion are selectively used.

By configuring as above, the present system can contain the recorded items of the color image recording apparatus 1 and the recorded items of the monochrome image recording apparatus 2 together in the common containing portion during distributed processing that uses in parallel the color image recording apparatus 1 and the monochrome image recording apparatus 2. The present system can also contain the recorded items of the color image recording apparatus 1 in the common containing portion during color-apparatus-alone processing that uses singly the color image recording apparatus 1. The present system can also contain the recorded items of the monochrome image recording apparatus 2 in the dedicated containing portion during monochrome-apparatus-alone, processing that uses singly the monochrome image recording apparatus 2. Thereby, parallel processing of two image recording jobs can be executed smoothly.

The configuration of each of the apparatuses will be described simply.

As shown in FIG. 3, the color image recording apparatus 1 comprises four image forming units 10BK, 10C, 10M, and 10Y, an intermediate transferring unit 20, a transfer fusing unit 30, a first recording paper sheet containing tray 41, a second recording paper sheet containing tray 42, a third recording paper sheet containing tray 43, a fourth recording paper sheet containing tray 44, a horizontal feed transporting path 51, a horizontal ejection transporting path 52, a first vertical transporting path 53, a second vertical transporting path 54, a third vertical transporting path 55, a horizontal return transporting path 56, and an ejection containing tray 77. The ejection containing tray 77 is a tray that contains recording paper sheets of monochrome images image-processed by the monochrome image recording apparatus 2 in the back (however, the sheets are usually contained in the common containing portion).

The color image recording apparatus 1 employs a tandem scheme as a method of recording a color image onto a recording paper sheet P that is a recording medium. The tandem scheme is a scheme of providing rotatably a semi-conductive endless belt, arranging a plurality of image forming portions that form visible images respectively of color tones that are different from each other in a line along a direction of move of the circumferential face of the endless belt, and forming one color image while the endless belt is rotating at least one time.

The above tandem scheme can be conventionally an intermediate transferring scheme of superimposing, on the circumferential face of the endless belt, the visible images respectively of the color tones formed respectively in the image forming portions and, thereafter, transferring the superimposed image onto a recording paper sheet P, and a transfer transporting scheme of transferring sequentially the visible images of the color tones formed respectively by the image forming portions onto the surface of a recording medium transported with being adsorbed on the circumferential face of the endless belt.

However, in the above tandem scheme, recently, a new scheme is employed that is different from the above intermediate transferring scheme or the transfer transporting scheme and the new scheme is employed also by the above color image recording apparatus 1. The new scheme of the tandem scheme comprises the four image forming units 10BK, 10C, 10M, and 10Y, the intermediate transferring unit 20, and the transfer fusing unit 30 in the components constituting the above color image recording apparatus 1. FIG. 4 exemplifies the configuration of the new scheme of the tandem scheme.

In FIG. 4, each of the image forming unit 10Y, 10M, 10C, and 10BK has a charging roller 12, a laser light illuminating portion 13, a developer 14, and a cleaner 16 disposed around a photo-sensitive drum 11. The developers of the units contain respectively toner T of colors of yellow (Y), magenta (M), cyan (C), and black (Bk).

The intermediate transferring unit 20 includes an intermediate transferring belt 21, an intermediate transferring belt driving roller 22, an intermediate transferring belt tension roller 23, primary transferring rollers 24 to electric-field-transfer the toner T from the photo-sensitive drums 11 onto the intermediate transferring belt 21 by providing an electric field between the photo-sensitive drums 11 and the intermediate transferring belt 21, an intermediate transferring belt cleaning unit 25 to clean out the toner T for transfer remaining on the intermediate transferring belt 21, and a secondary transferring backup roller 26 to transfer the toner T from the intermediate transferring belt 21 to a transfer fusing roller 31. Of these components, the intermediate transferring belt 21 is put around the intermediate transferring belt driving roller 22 and the intermediate transferring belt tension roller 23 and is rotationally driven by a driving portion not shown and the intermediate transferring belt driving roller 22 in the direction of an arrow.

The transfer fusing unit 30 includes the transfer fusing roller 31, a heating lamp 36 that is an internal heat source to heat the transfer fusing roller 31, a pressure roller 32, and a temperature detecting member 34. In addition to these components, a pressure heating roller 33 that pressurizes and heats, on the transfer fusing roller 31, the toner T that has been heated and melted on the transfer fusing roller 31, a heating lamp 37 that is a heat source to heat internally the pressure heating roller 33, a temperature detecting member 35 to detect the temperature of the pressure heating roller 33, etc., are provided. A recording paper sheet P is transported to a transfer fusing nip that is a contacting portion between the transfer fusing roller 31 and the pressure roller (pressurizing member) 32 by a paper sheet transporting member not shown.

The transfer fusing roller 31 used in the above transfer fusing unit 30 has the heating lamp 36 therein that is the heating source to heat and melt the toner T on the transfer fusing roller. The surface temperature of the transfer fusing roller 31 is controlled by heating at a specific temperature within a range of about 120° C. to 180° C. This temperature is set at the optimal temperature according to the type of toner material, the processing speed, the nip width and the loading condition of the transfer fusing nip that is the contacting portion between the transfer fusing roller 31 and the pressure roller 32, etc.

The feature of the above tandem-scheme color image recording apparatus employing the new scheme and having the above configuration is that a visible image is transferred from the photo-sensitive drums 11 onto the intermediate transferring belt 21 using the primary transferring rollers 24, the visible image transferred onto the intermediate transferring belt 21 is further transferred onto the transfer fusing roller 31, and, thereafter, the visible image transferred onto the transfer fusing roller 31 is transferred and fused onto the recording paper sheet P. That is, the above tandem scheme that is the new scheme does not need any fusing portion that has been used conventionally because the visible image is transferred and simultaneously fused onto the recording paper sheet P. Therefore, the apparatus has an advantage that the space for installing the fusing portion can be eliminated.

However, in the above tandem-scheme color image recording apparatus employing the new scheme, the transfer fusing roller 31 of the transfer fusing unit 30 heats and melts the toner T on the transfer fusing roller 31 as described above and, therefore, the surface temperature of the transfer fusing roller 31 is heated and controlled at a specific temperature within a range of about 120° C. to 180° C. The heated intermediate transferring belt 21 moves to the position of the image forming unit 10Y and the heat of the intermediate transferring belt 21 may give an adverse effect such as that the heat melts the toner T attached to the photo-sensitive drum 11 of the image forming unit 10Y.

To prevent the heat of the intermediate transferring belt 21 from giving the adverse effect to the image forming unit 10Y, the heat of the intermediate transferring belt 21 needs to be dissipated until the intermediate transferring belt 21 that has passed the transfer fusing roller 31 moves to the position of the image forming unit 10Y. Therefore, as shown in FIG. 4, according to the tandem scheme that is the above new scheme, the transfer fusing roller 31 of the transfer fusing unit 30 is disposed at a position with which the distance of the move of the belt from the transfer fusing roller 31 of the transfer fusing unit 30 to the image forming unit 10Y that is the closest unit to the roller 31 as to the intermediate transferring belt 21 is elongated as much as possible.

That is, on the upper side of the intermediate transferring belt 21 put tensely around the intermediate transferring belt tension roller 23 disposed forward and the intermediate transferring belt driving roller 22 disposed backward, fore and aft, the image forming unit 10Y, the image forming unit 10M, the image forming unit 10C, and the image forming unit 10BK are disposed and, the transfer fusing unit 30 is disposed at a position somewhat anterior on the lower side of the intermediate transferring belt 21 with respect to the side on which the image forming units are disposed. Thereby, the distance of the move of the intermediate transferring belt 21 from the transfer fusing roller 31 to the image forming unit 10Y that is closest to the roller 31 is elongated to the maximum within a possible range in terms of the mechanism.

In the above color image recording apparatus 1, the configuration and disposition of the recording paper sheet containing tray that contains the recording paper sheets P are as follows. As described above, the intermediate transferring unit 20 is disposed being put tensely around the intermediate transferring belt tension roller 23 disposed forward and the intermediate transferring belt driving roller 22 disposed backward. However, the first recording paper sheet containing tray 41 and the second recording paper sheet containing tray 42 are disposed horizontally fore and aft under the intermediate transferring unit 20.

Between the first recording paper sheet containing tray 41 and the second recording paper sheet containing tray 42, and the intermediate transferring unit 20, the transfer fusing unit 30 that corresponds to the above image transferring portion is disposed in a somewhat anterior position, that is, above the first recording paper sheet containing tray 41. Under the first recording paper sheet containing tray 41 and the second recording paper sheet containing tray 42, the third recording paper sheet containing tray 43 is disposed and, under the third recording paper sheet containing tray 43, the fourth recording paper sheet containing tray 44 is disposed.

In those trays, the first recording paper sheet containing tray 41 and the second recording paper sheet containing tray 42 have the same configuration and the same size, and the third recording paper sheet containing tray 43 and the fourth recording paper sheet containing tray 44 have the same configuration and the same size. The longitudinal lengths of the third recording paper sheet containing tray 43 and the fourth recording paper sheet containing tray 44 is substantially same as the length from the front end of the first recording medium containing portion to the back end of the second recording medium containing portion. The widths of the above recording paper sheet containing trays 41, 42, 43, and 44 are all same. Each of the above recording paper sheet containing trays 41, 42, 43, and 44 is able to be attached to and detached from the interior of the color image recording apparatus 1 through the side (the face closer to the reader in FIG. 4) of the color image recording apparatus 1.

Each of the first recording paper sheet containing tray 41 and the second recording paper sheet containing tray 42 is a recording paper sheet containing tray that contains the recording paper sheets P having the size of A4 or smaller and each of the third recording paper sheet containing tray 43 and the fourth recording paper sheet containing tray 44 is a recording paper sheet containing tray that contains the recording paper sheets P having the size of A3 at largest. Each of the above recording paper sheet containing trays 41, 42, 43, and 44 is provided with a recording paper sheet detecting sensor that detects presence/absence of the recording paper sheets P contained therein.

At the upper ends in the back portions of the above first recording paper sheet containing tray 41, the second recording paper sheet containing tray 42, the third recording paper sheet containing tray 43, and the fourth recording paper sheet containing tray 44, a first transporting gate path, a second transporting gate path, a third transporting gate path, and a fourth transporting gate path are respectively provided as transporting gate paths to transport the recording paper sheets P from inside the tray to outside the trays. Each of the transporting gate paths is provided with a roller for transporting the recording paper sheets and, when the recording paper sheets P are transported out of each of the paper sheet containing trays, the rollers for transporting the recording paper sheets are driven by driving portions not shown and the recording paper sheets P are transported out.

In the above color image recording apparatus 1, a transporting path to transport the recording paper sheets P is configured as follows. That is, recording of characters and figures onto the recording paper sheets P is executed by the transfer fusing nip formed by the contact of the transfer fusing roller 31 and the pressure roller 32 of the transfer fusing unit 30 and, therefore, the recording paper sheet P needs to be transported to the transfer fusing nip. Therefore, the horizontal feed transporting path 51 that transports and feeds the recording paper sheet P to the transfer fusing nip is formed such that the path 51 extends horizontally from the transfer fusing nip of the transfer fusing unit 30 to the back. The horizontal ejection transporting path 52 that transports and ejects the recording paper sheet P from the transfer fusing nip is formed such that the path 52 extends horizontally from the transfer fusing nip of the transfer fusing unit 30 to the front. The horizontal ejection transporting path 52 is connected with the front portion of the bypass transporting path apparatus 5 described later, and is connected with the final processing apparatus 3 described later through this portion.

The first vertical transporting path 53 is formed upward from a position between the first recording paper sheet containing tray 41 and the second recording paper sheet containing tray 42 and the upper end of the first vertical transporting path 53 is connected with the middle portion of the horizontal feed transporting path 51. The second vertical transporting path 54 is formed upward from the back of the second recording paper sheet containing tray 42 and the upper end of the second vertical transporting path 54 is connected with the back end of the horizontal feed transporting path 51. As described later, these transporting paths are used to respectively feed the recording paper sheets P from the recording paper sheet containing trays 41, 42, 43, and 44 to the transfer fusing unit 30 and to eject the recording paper sheets P that are fed.

Therefore, the above first vertical transporting path 53 is connected with the first transporting gate path of the first recording paper sheet containing tray 41, and the second vertical transporting path 54 is connected with the second transporting gate path of the second recording paper sheet containing tray 42, the third transporting gate path of the third recording paper sheet containing tray 43, and the fourth transporting gate path of the fourth recording paper sheet containing tray 44.

The third vertical transporting path 55 is branched from the horizontal feed transporting path 51 and directed downward, and formed in front of the first recording paper sheet containing tray 41 and the third recording paper sheet containing tray 43. The portion of the branching of the third vertical transporting path 55 from the horizontal feed transporting path 51 is provided with a transporting path switching lever 58. The horizontal return transporting path 56 is formed between the first recording paper sheet containing tray 41 and the transfer fusing unit 30, horizontally extending backward and branching from the upper portion of the above third vertical transporting path 55. The backend of the horizontal return transporting path 56 is connected with the middle portion of the first vertical transporting path 53. The portion of the branching of the horizontal return transporting path 56 from the third vertical transporting path 55 is provided with a transporting path switching lever 59. The third vertical transporting path 55 and the horizontal return transporting path 56 are provided to enable the recording of characters, figures, etc., onto both sides of the recording paper sheets P.

The above horizontal feed transporting path 51, the horizontal ejection transporting path 52, the first vertical transporting path 53, the second vertical transporting path 54, the third vertical transporting path 55, and the horizontal return transporting path 56 are provided with rollers and guides (not shown) driven by a driving portion not shown and these rollers and guides transport the recording paper sheets P.

The monochrome image recording apparatus 2 will be described. The monochrome image recording apparatus 2 records monochrome characters, figures, etc., onto the recording paper sheets P. In FIG. 3, the monochrome image recording apparatus 2 comprises a monochrome image forming unit 60, a fusing unit 63, a first recording paper sheet containing tray 141, a second recording paper sheet containing tray 142, a third recording paper sheet containing tray 143, a fourth recording paper sheet containing tray 144, a horizontal feed transporting path 151, a horizontal eject transporting path 152, a first vertical transporting path 153, a second vertical transporting path 154, a third vertical transporting path 155, a horizontal return transporting path 156, and an ejection containing tray 157 that contains the recording paper sheets of monochrome images that have been image-processed.

Different from the above color image recording apparatus 1, in the above monochrome image recording apparatus 2, the monochrome image forming unit 60 does not include any fusing function and, separately, the fusing unit 63 comprising a fusing roller 64 and a pressure roller 65 is present independently. The above monochrome image forming unit 60 is provided with a portion comprising a photo-sensitive drum 61 and a pressure roller 62 and corresponding to the above image transferring portion, and a monochrome image formed on the surface of the photo-sensitive drum 61 is transferred onto the recording paper sheet P.

The above monochrome image recording apparatus 2 can be configured by replacing the transfer fusing unit 30 in the above color image recording apparatus 1 with the photo-sensitive drum 61 and the pressure roller 62. That is, the configuration and the disposition of recording paper sheet containing trays that contain the recording paper sheets P and transporting paths that transport the recording paper sheets P in the above monochrome image recording apparatus 2 are completely same as those of the recording paper sheet containing trays and the transporting paths of the above color image recording apparatus 1. Therefore, description for these is omitted. However, different from the color image recording apparatus 1, the horizontal eject transporting path 152 of the monochrome image recording apparatus 2 is connected with the back end of the bypass transporting path apparatus 5 described later and is connected with the final processing apparatus 3 described later through the bypass transporting path apparatus 5. In FIG. 3, the parts concerning the recording paper sheet containing trays that contain the recording paper sheets P and the transporting paths that transport the recording paper sheets P in the monochrome image recording apparatus 2 are denoted by numerals in 100s and the lower two digits of these numerals are same as the numerals of the corresponding parts in the color image recording apparatus 1.

The transporting path connecting apparatus 6 will be described. The transporting path connecting apparatus 6 is used attached to the front portion of the monochrome image recording apparatus 2 and has a function of transporting the recording paper sheets P transported by the horizontal eject transporting path 152 of the monochrome image recording apparatus 2 to the back end of the bypass transporting path apparatus 5 attached to the color image recording apparatus 1.

Therefore, the transporting path connecting apparatus 6 is provided with a bypass ascending transporting path 71. The back end of the bypass ascending transporting path 71 is connected with the front end of the horizontal eject transporting path 152 of the monochrome image recording apparatus 2. The bypass ascending transporting path 71 has the back end thereof forming a horizontal transporting path and this path bends upward in an ark shape from the back end to the middle portion of the path. The middle portion of the path forms a vertical transporting path and this path bends forward in an arc shape from the middle portion to the front end. The front end forms a horizontal transporting path. The above bypass ascending transporting path 71 is provided with rollers and guides (not shown) driven by a driving portion not shown.

In the above transporting path connecting apparatus 6, the recording paper sheet P delivered from the horizontal eject transporting path 152 of the monochrome image recording apparatus 2 is transported forward horizontally over a small distance by the back end of the bypass ascending transporting path 71, thereafter, transported upward from a lower position by the middle portion of the bypass ascending transporting path 71, and transported further forward horizontally over a small distance by the front end of the bypass ascending transporting path 71.

The bypass transporting path apparatus 5 will be described. The bypass transporting path apparatus 5 is attached to the color image recording apparatus 1 with covering thereover from the front portion to the upper portion of the color image recording apparatus 1. The bypass transporting path apparatus 5 transports the recording paper sheet P delivered from the bypass ascending transporting path 71 of the transporting path connecting apparatus 6 to the final processing apparatus 3. The bypass transporting path apparatus 5 also transports the recoding paper sheet P ejected and delivered from the horizontal eject transporting path 52 of the color image recording apparatus 1 to the final processing apparatus 3.

Therefore, the bypass transporting path apparatus 5 is provided with a bypass horizontal transporting path 72, a bypass descending transporting path 73, a rear main transporting path 74, and a front main transporting path 75. The back end of the bypass horizontal transporting path 72 is connected with the front end of the bypass ascending transporting path 71 of the transporting path connecting apparatus 6. The front end of the bypass horizontal transporting path 72 is connected with the upper end of the bypass descending transporting path 73. The lower end of the bypass descending transporting path 73 joins and is connected with a main transporting path joining middle portion 76 that is a connecting portion of the rear main transporting path 74 and the front main transporting path 75. The rear end of the front main transporting path 75 is connected with the front end of the horizontal eject transporting path 52 of the color image recording apparatus 1. Each of the above bypass horizontal transporting path 72, the bypass descending transporting path 73, the rear main transporting path 74, and the front main transporting path 75 is provided with rollers and guides (not shown) driven by a driving portion not shown.

The upper face portion of the housing of the bypass transporting path apparatus 5, a portion of the bypass horizontal transporting path 72 of the bypass transporting path apparatus 5, and a portion of the bypass descending transporting path 73 are configured integrally and form a bypass transporting path releasing portion 5*a*. The bypass transporting path releasing portion 5*a* can be opened and closed with a supporting point 5*b* as the center provided at the lower end of the front end of the bypass transporting path releasing portion 5*a*. Therefore, disposition for jamming of the recording paper sheet P occurred in the bypass horizontal transporting path 72 or the bypass descending transporting path 73 and maintenance can be easily executed.

In the above bypass transporting path apparatus 5, the recording paper sheet P delivered by the bypass ascending transporting path 71 of the transporting path connecting apparatus 6 to the bypass horizontal transporting path 72 is transported forward horizontally by the bypass horizontal transporting path 72, is transported vertically downward by the bypass descending transporting path 73, is delivered to the front main transporting path 75 in the main transporting path joining middle portion 76, is transported forward horizontally by the front main transporting path 75, and is delivered to the final processing apparatus 3. While, the recording paper sheet P delivered from the horizontal eject transporting path 52 of the color image recording apparatus 1 to the rear main transporting path 74 is also transported forward horizontally by the front main transporting path 75 and is delivered to the final processing apparatus 3.

In this case, the recording paper sheet P delivered from the transporting path connecting apparatus 6 and the recording paper sheet P delivered from the color image recording apparatus 1 may compete and collide with each other in the main transporting path joining middle portion 76. To avoid this collision, temporary detention control for the recording paper sheet P in the bypass horizontal transporting path 72 may be adapted to be executed to the bypass transporting path apparatus 5.

An upper containing transporting path 78 and an upper containing tray 77 are provided above the bypass transporting path 5 described above. The upper containing transporting path 78 is provided such that the path 78 branches from the bypass horizontal transporting path 72. The path 78 receives, by the switching of a transporting path switching lever 79, the recording paper sheet P transported by the bypass horizontal transporting path 72 and transports the sheet P to contain the sheet P in the upper containing tray 77. The upper containing tray 77 is provided as a recording paper sheet containing tray dedicated to the monochrome image recording apparatus 2 to enable the recording paper sheet P recorded in the monochrome image recording apparatus 2 to be received and contained on the way to the final processing apparatus 3 without transporting the sheet P thereto.

The final processing apparatus 3 will be described. The final processing apparatus 3 is an apparatus that receives and contains the recording paper sheet P recorded with an image by the color image recording apparatus 1 or the monochrome image recording apparatus 2. For the sheet P to be received and contained as above, the apparatus 3 has a function of receiving and containing a plurality of recording paper sheets P in order of the sheets P as transported, and binding and making a book with the plurality of recording paper sheets P contained.

Therefore, the final processing apparatus 3 includes a first containing horizontal transporting path 81, a second containing horizontal transporting path 82, a third containing transporting path 83, a transporting path switching lever 84, a finisher portion 85, a first containing tray 86, and a second containing tray 87. In these components, the first containing horizontal transporting path 81, the second containing horizontal transporting path 82, and the third containing transporting path 83 are used to transport the recording paper sheet P delivered from the front main transporting path 75 of the bypass transporting path apparatus 5 to the finisher portion 85 or the second containing tray 87.

The back end of the first containing horizontal transporting path 81 is connected with the front end of the front main transporting path 75 of the bypass transporting path apparatus 5. The front end of the first containing horizontal transporting path 81 is connected with the back end of the second containing horizontal transporting path 82 and the upper end of the third containing transporting path 83. This connecting portion is provided with the transporting path switching lever 84. Whether the recording paper sheet P transported by the first containing horizontal transporting path 81 that has a small transporting distance is transported to the second containing horizontal transporting path 82 or the third containing transporting path 83 is switched by the transporting path switching lever 84. The third containing transporting path 83 forms a vertical transporting path heading downward from the upper end and forms a horizontal transporting path after bending in an arch shape toward substantially the front on the way. The above first containing horizontal transporting path 81, second containing horizontal transporting path 82, and third containing transporting path 83 are provided with rollers and guides (not shown) driven by a driving portion not shown.

The finisher portion 85 is disposed under the front end of the second containing horizontal transporting path 82. The finisher portion 85 stocks the recording paper sheets P transported by the second containing horizontal transporting path 82 sequentially, binds and make books with, etc., the sheets P, and sends the sheets P to the first containing tray 86. The recording paper sheets P transported by the third containing transporting path 83 are received and contained in the second containing tray 87 in order of the sheets P as transported. As above, the final processing apparatus 3 corresponds to the common recorded item containing portion described above. Therefore, the above recorded item containing portion can be the first containing tray 86 that can make books and the second containing tray 87 that simply receives and contains the sheets P in order of the sheets P as transported.

Figure 5:
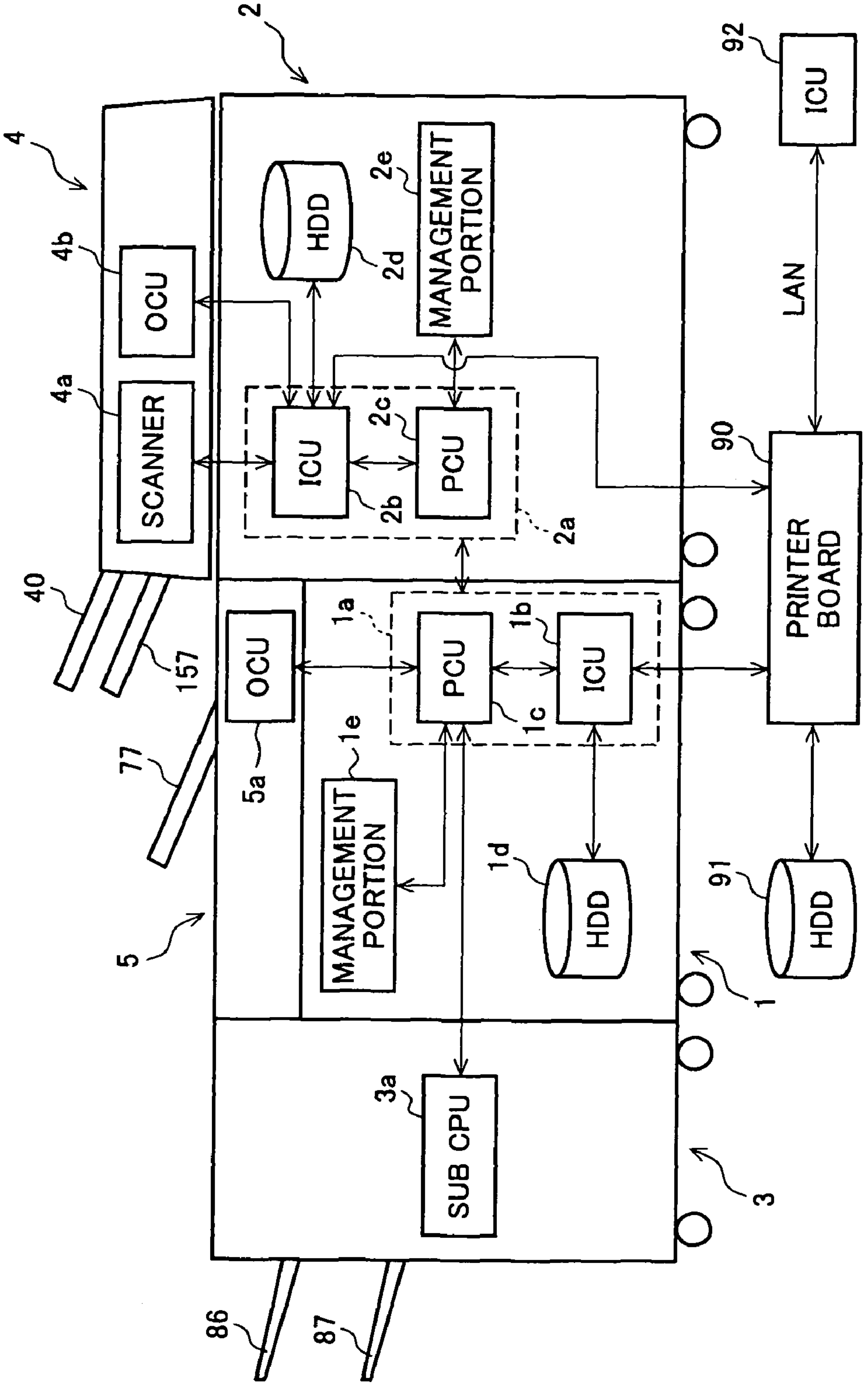
FIG. 5 is a block diagram of an example of the main part that executes image recording control in the image recording system of FIG. 1.

The example of the configuration of the present system has been described referring to FIGS. 1 to 4, and the control of the present system will be described referring to FIG. 5. FIG. 5 is a block diagram of an example of the main part that executes image recording control in the image recording system of FIG. 1. In FIG. 5, though the transporting path connecting apparatus 6 is not shown, the apparatus 6 is provided between the monochrome image recording apparatus 2 and the color image recording apparatus 1 as shown in FIGS. 1 to 4.

The color image recording apparatus 1, the monochrome image recording apparatus 2, and the final processing apparatus 3 respectively have a color-side controlling portion, a monochrome-side controlling portion, and a final-processing-side controlling portion. Of these components, the color-side controlling portion includes a controlling function for the bypass transporting path apparatus 5 and the monochrome-side controlling portion includes a controlling function for the color image reading apparatus 4 and the transporting path connecting apparatus 6.

In addition, the color-side controlling portion also includes, in a main controlling portion 1*a*, controlling functions such as switching, recovery, etc., (described later) that are necessary as the present system. However, as described later, these controlling functions necessary as the present system may be provided to the monochrome-side controlling portion and may be provided to both of the monochrome-side controlling portion and the color-side controlling portion. As the intermediate form of the above two, a controlling portion may be provided in the bypass transporting path apparatus 5 or the transporting path connecting apparatus 6.

The color-side controlling portion includes a color-side ICU (Image Controlling Unit) 1*b* and a color-side PCU (Print Controlling Unit) 1*c* as the color-side main controlling portion 1*a*, and comprises the color-side main controlling portion 1*a*, a color-side OCU (Operator Controlling Unit) 5*a* having a color-side operating panel 201 (see FIGS. 1 and 2), a color-side HDD 1*d*, and a color-side management portion 1*e*.

The color-side ICU 1*b* executes processes concerning color image data processed in the color image recording apparatus 1. When the color image recording apparatus 1 is used as an independent single apparatus and, when a color scanner, etc., is installed also in the upper portion of the color image recording apparatus 1, the color-side ICU 1*b* executes processes concerning the color scanner, etc. The color-side HDD 1*d* stores temporarily image data read by the color image reading apparatus 4. The color-side PCU 1*c* controls the above color image recording apparatus 1. The color-side OCU 5*a* is a part that is controlled by a user (operator) that operates the color image recording apparatus 1, and includes the color-side operating panel 201 (see FIGS. 1 and 2) disposed with a touch panel on a liquid crystal display. The color-side management portion 1*e* is a memory that stores management information for managing the processes that the color image recording apparatus 1 executes. The color-side PCU 1*c* refers to the management information stored by the color-side management portion 1*e* and controls the color image recording apparatus 1 based on the referred information.

The monochrome-side controlling portion includes a monochrome-side ICU 2*b* and a monochrome-side PCU 2*c* as a monochrome-side main controlling portion 2*a*, and comprises the monochrome-side main controlling portion 2*a*, a monochrome-side OCU 4*b* having a monochrome-side operating panel 202 (see FIGS. 1 and 2), a monochrome-side HDD 2*d*, and a monochrome-side management portion 2*e*.

The monochrome-side ICU. 2*b* basically executes processes concerning monochrome image data processed in the monochrome image recording apparatus 2. However, when the color image reading apparatus 4 is installed in the upper portion of the monochrome image recording apparatus 2 as the present system, the ICU 2*b* executes control concerning a color scanner 4*a* including processes of color image data read by the color scanner 4*a* in the color image reading apparatus 4. The monochrome-side HDD 2*d* stores temporarily the above image data. The monochrome-side PCU 2*c* controls the above monochrome image recording apparatus 2. The monochrome-side OCU 4*b* is a part that is operated by the operator that operates the monochrome image recording apparatus 2, and includes the monochrome-side operating panel 202 (see FIGS. 1 and 2) disposed with a touch panel on a liquid crystal display. The monochrome-side management portion 2*e* is a memory that stores management information for managing processes executed by the monochrome image recording apparatus 2. The monochrome-side PCU 2*c*refers to the management information stored by the monochrome-side management portion 2*e* and controls the monochrome image recording apparatus 2 based on the referred information.

A final-processing-side controlling portion 3*a* comprises a SUB CPU (Sub-Central Processing Unit) 3*a*. The sub CPU 3*a* controls the final processing apparatus 3. However, the final-processing-side controlling portion does not need to include any OCU. Information from the color-side OCU 5*a* of the color-side controlling portion or the monochrome-side OCU 4*b* of the monochrome-side controlling portion may be used as the information concerning operation instructions to the final processing apparatus 3.

In addition, the present system also includes a printer board 90 and an HDD 91 as parts concerning the control thereof. The printer board 90 is connected with the color-side ICU 1*b* and the monochrome-side ICU 2*b*. The printer board 90 is connected with a LAN installed outside the present system and is connected with an ICU 92 of another LAN-connected image recording apparatus or a PC through the LAN. The printer board 90 receives image data transmitted from a PC, etc., to the present system through a LAN and transmits the received data to the color-side ICU 1*b* or the monochrome-side ICU 2*b*. The HDD 91 stores temporarily the image data.

For the control of the present system, the color-side PCU 1*c* that controls the color image recording apparatus 1 and the monochrome-side PCU 2*c* that controls the monochrome image recording apparatus 2 are interconnected and are adapted to be able to exchange necessary information with each other. The color image reading apparatus 4 is connected with both of the monochrome-side ICU 2*b* and the color-side ICU 1*b* and is adapted to store all the image data read by the color scanner 4*a* in the color-side HDD 1*d*. The present system provides a function of controlling the entire system to the color-side PCU 1*c*. Therefore, the color-side PCU 1*c* issues instructions to the monochrome-side PCU 2*c* and the sub CPU 3*a* of the final-processing-side controlling portion 3*a* such that the present system operates the process most efficiently.

The above color-side OCU 5*a* and the above monochrome-side OCU 4*b* are respectively independent OCUs as the color-side OCU 5*a* originally issues only instructions to the color image recording apparatus 1 and, similarly, the monochrome-side OCU 4*b* originally issues only instructions to the monochrome image recording apparatus 2. For example, the type of the recording papers sheets P contained in the color image recording apparatus 1 and the monochrome image recording apparatus 2, and information of corresponding recording paper sheet containing trays, etc., containing the recording paper sheets P, are respectively inputted separately from the color-side OCU 5*a* and the monochrome-side OCU 4*b*.

However, in the control of the present system, the color-side OCU 5*a* and the monochrome-side OCU 4*b* divide the roles between each other to improve the efficiency of the present system. That is, the monochrome-side operating panel 202 (see FIGS. 1 and 2) of the monochrome image recording apparatus 2 installed with the color image reading apparatus 4 issues instructions on inputting, processing, etc., of the image data concerning the color image reading apparatus 4, the monochrome image recording apparatus 2, the color image recording apparatus 1, and the final processing apparatus 3. The color-side operating panel 201 on the color image recording apparatus 1 is adapted to display the operating states of the monochrome image recording apparatus 2 and the color image recording apparatus 1 and instructions, etc., of checks and processing of image data already inputted. Due to this dividing of the roles, the color-side operating panel 201 provided to the color image recording apparatus 1 and the monochrome-side operating panel 202 provided to the monochrome image recording apparatus 2 respectively have configurations that are different from each other (see FIGS. 1 and 2).

Description will be made of the control function, such as the switching and returning (recovery), necessary for the image recording system of the present invention, which is included in the main controlling portion 1*a* of the color-side controlling portion. That is, in this description, the color-side main controlling portion 1*a* of the color image recording apparatus 1 acts as the above process switching portion and the switching determining portion, or the above process switching portion and the switching determining portion as well as a process recovering portion and a recovery determining portion described later, to control the monochrome-side main controlling portion 2*a* of the monochrome image recording apparatus 2.

Each portion can be realized by incorporating executably into the color-side main controlling portion 1*a* a program to cause a computer including a CPU in the main controlling portion 1*a*, a RAM (Random Access Memory) that is a work area, a ROM (Read Only Memory), etc., to function as the process switching portion and the switching determining portion, or the process switching portion and the switching determining portion as well as the process recovering portion and the recovery determining portion. "Incorporating executably" means, for example, to incorporate a program into the ROM (or rewritable ROM) such that the program is read out onto the RAM and executed by the CPU.

The predetermined condition of the switching determining portion and the predetermined condition of the recovery determining portion may be stored in the color-side management portion 1*e* and/or the monochrome-side management portion 2*e*, for example, and may be read from the color PCU 1*c* and/or the monochrome PCU 2*c*.

Description will be made of preferred embodiment of the switching control, the recovery control, etc., in each portion, which are the main features of the present invention.

The present system includes the above process switching portion and the switching determining portion, which are the main features of the present invention. The process switching portion in the example shown in FIGS. 1 to 4 switches an image recording process executed by one image recording apparatus (e.g., monochrome image recording apparatus 2) to a substitute image recording process of the other image recording apparatus (e.g., color image recording apparatus 1). The switching determining portion determines whether the switching is executed by the process switching portion, depending on whether the predetermined condition is satisfied.

For example, if the predetermined condition includes that arrival of recorded item at the recorded item containing portion (illustrated by the first containing tray 86 or second containing tray 87 of the final processing apparatus 3) is delayed in one image recording apparatus of the color image recording apparatus 1 and the monochrome image recording apparatus 2, which executes an image recording process, as compared to the other image recording apparatus, the process is switched to the other image recording apparatus by the process switching portion based on a prediction that the arrival of the recorded item is delayed. That is, the present system employing this example performs control until the recorded item is outputted from one image recording apparatus to the recorded item containing portion (until the output is started) such that the other image recording apparatus outputs the same recorded item if the other image recording apparatus is faster. The time until the arrival of the recorded item means a time until the output of the recorded item reaches a completion state (practically, a predicted time based on specifications, etc., because the time must be comprehended before the recording process). The time until the arrival of the recorded item in this case is obviously synonymous with a time until the arrival of the recorded item at a merging portion on the way to the recorded item containing portion.

Although described later, in other examples of the predetermined condition, for example, it may be determined whether subsequent image recording is continued by switching to the other image recording apparatus in situations where the arrival of the recorded item is delayed, including situations where the image recording cannot be continued in one image recording apparatus, or it may be determined whether the switching is executed, depending on whether the other image recording apparatus is operated, for example.

On the other hand, after executing the switching by the process switching portion in the present system, it is preferred that the original image recording process is recovered from the substitute image recording process. Therefore, the present system preferably includes the following process recovering portion and the recovery determining portion. After the switching is executed by the process switching portion, the process recovering portion recovers the image recording process from the substitute image recording process in the other image recording apparatus. The recovery determining portion determines whether the recovery is executed by the process recovering portion, depending on whether a predetermined condition is satisfied.

For example, if the predetermined condition includes that the arrival of the recorded item at the recorded item containing portion is faster in the image recording apparatus executing the image recording process than the other image recording apparatus, the process is recovered (switched) by the process switching portion from the substitute image recording process to the image recording process in the original image recording apparatus based on a prediction that the arrival of the recorded item is faster. Various forms may be employed and, for example, even when the arrival of the recorded item is not faster than the other image recording apparatus, if the FCOT is prioritized, the recording is carried on in the substitute image recording process until the recorded item of the original recording process arrives.

Although described later, in other examples of the predetermined condition, it may be determined whether subsequent image recording is continued by switching for recovering to the original image recording apparatus, for example, in situations where the above arrival of the recorded item becomes faster, including situations where the image recording cannot be continued in the other image recording apparatus, or it may be determined whether the recovery is executed, depending on whether the original image recording apparatus is operated, for example.

Figure 6:
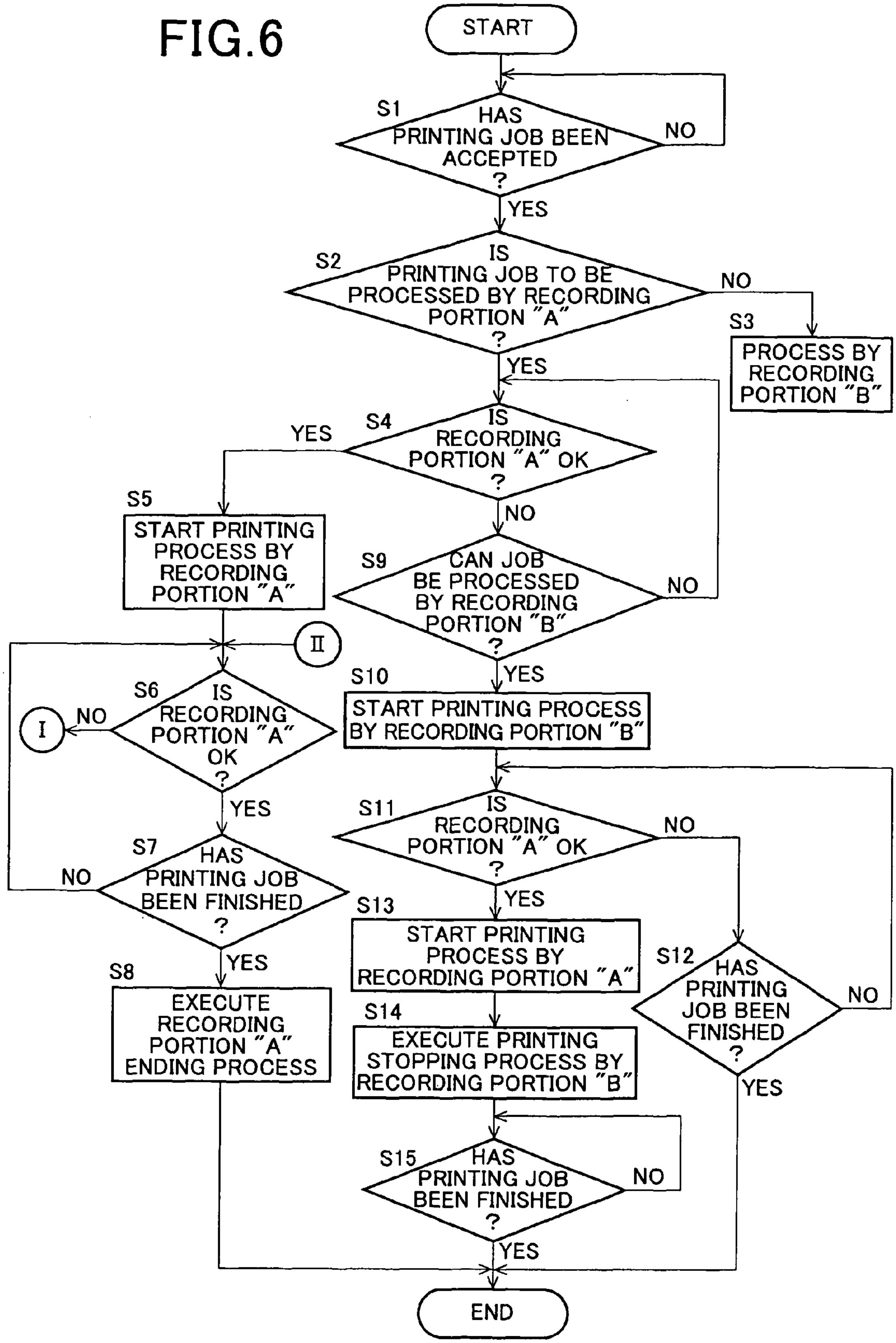
FIG. 6 is an explanatory flowchart of an example of a switching and a recovering processes in the image recording system described referring to FIGS. 1 to 5.
Figure 7:
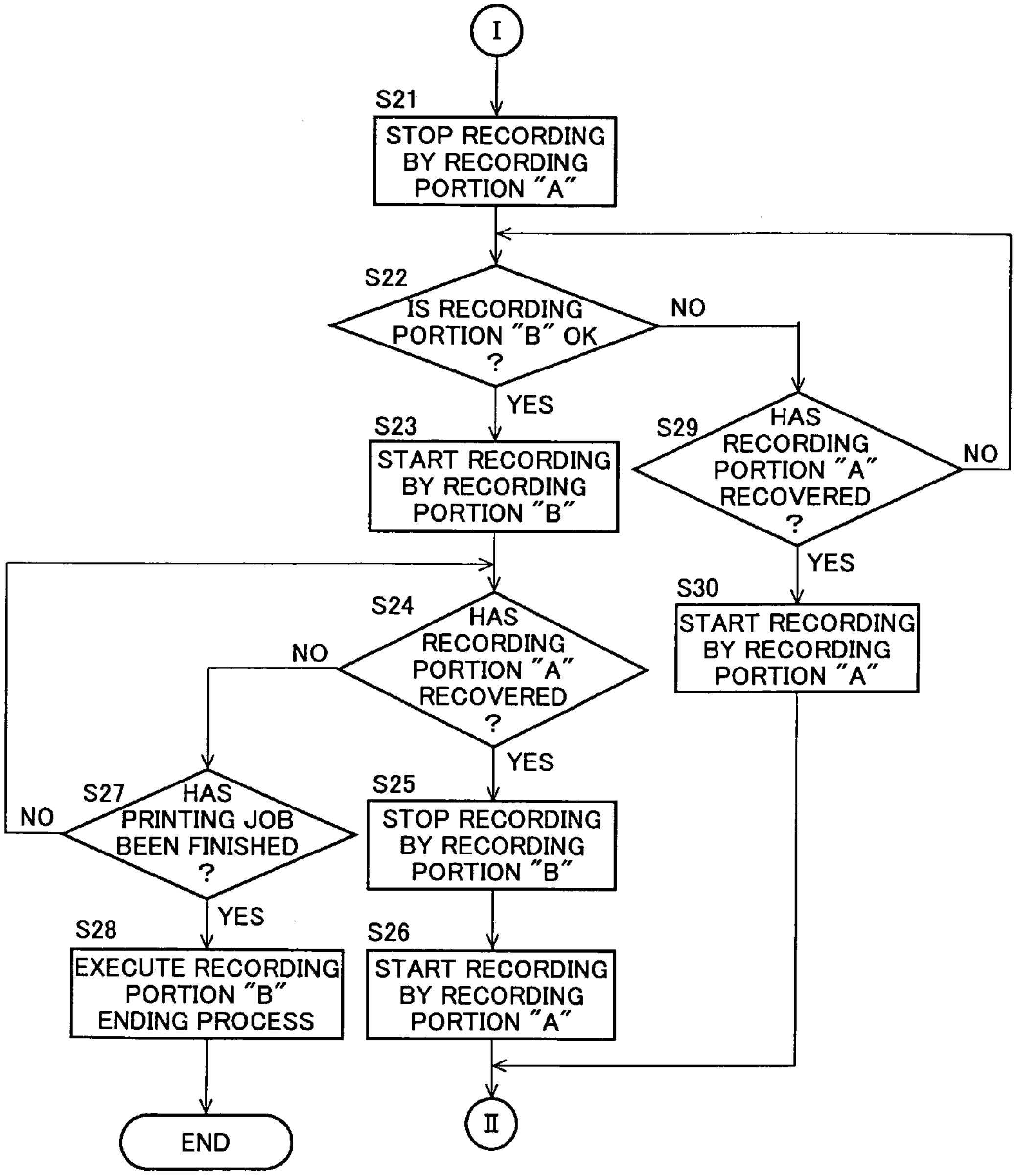
FIG. 7 is a flowchart continued from FIG. 6.

FIGS. 6 and 7 show an explanatory flowchart of an example of the switching and the recovering processes in the image recording system described referring to FIGS. 1 to 5. The above switching and the recovering processes in the process switching portion and the process recovering portion will be described referring to FIGS. 5 to 7. In the description, the processes will be described assuming that the controlling functions such as switching and recovery necessary as the image recording system of the present invention is provided to the color-side main controlling portion 1*a*.

In the present system, the color-side main controlling portion 1*a* judges whether there is acceptance of a printing job (step S1) and executes the following steps from the time when the printing job has been accepted. The printing job is accepted due to transmission of a print instruction from an external apparatus such as an external PC through a LAN, etc., to the color-side main controlling portion 1*a* through the printer board 90 or transmission of an print instruction through the monochrome-side main controlling portion 2*a* by reading of the scanner 4*a* or operation of a user. Though FIG. 5 does not show the paths of the transmission, the present system may be configured to transmit the read data from the scanner 4$a$ not to the ICU 2$b$ but directly to the color-side main controlling portion 1$a$ (or the color-side ICU 1$b$ therein) and process the read data thereafter. In this case, the "acceptance of a printing job" refers to an occasion when the print instruction has been received by the color-side main controlling portion 1$a$ by the reading of the scanner 4$a$ or the operation by the user.

The color-side main controlling portion 1$a$ judges whether the printing job accepted at step S1 is to be processed by a recording portion A (assuming, for example, recording by the PCU 1$c$ of the color image recording apparatus 1) or to be processed by a recording portion B (assuming, for example, recording by the PCU 2$c$ of the monochrome image recording apparatus 2) based on, for example, whether the accepted printing job includes color image recording. When the job is processed by the recording portion B, processing by the recording portion B is executed (step S3). When the job is processed by the recording portion A, processing at step S4 and later are executed. Similar processing as those at step S4 and later may be executed as the processing by the recording portion B at step S3 and the description thereof is omitted because the processing can be described by describing with the recording portion A and the recording portion B exchanged with each other.

At step S4, the color-side main controlling portion 1$a$ checks the operation of the recording portion A as to whether the recording portion A can process based on outputs of various sensors provided to portions of the recording portion A, etc. The criterion at step S4 also is a threshold of one predetermined condition in the switching determining portion. When the recording portion A can process, the color-side main controlling portion 1$a$ issues a start instruction to the color-side PCU 1$c$ and the recording portion A starts a printing process (step S5). After the start, the color-side main controlling portion 1$a$ monitors running out of supplies (paper sheets, toner, etc.), etc., when necessary and judges whether the recording process can be continued (step S6). The criterion at step S6 also is a threshold of one predetermined condition in the switching determining portion. When the processing can be continued at step S6, the controlling portion 1$a$ judges whether the printing job has been finished (step S7). When the printing job has been finished, the ending process of the recording portion A is executed (step S8). When the printing job is judged not to have been finished at step S7, the checking of the operation at step S6 is kept executed and, concurrently, the processing by the recording portion A is continued to the end of the job.

When it is judged at step S4 that the recording portion A can not process, the color-side main controlling portion 1$a$ judges whether the recording portion B can process the printing job to be executed and, when the printing job can be processed, causes the monochrome-side main controlling portion 2$a$ to check the operation of the recording portion B as to whether the recording portion B is operable based on outputs of various sensors included in portions of the recording portion B, etc., obtains the result of the check, and judges whether the recording portion B can process the printing job and is operable currently (step S9). The criterion at step S9 also is a threshold of one predetermined condition in the switching determining portion. When it is judged at step S9 that the recording portion B can not process, the procedure is returned to step S4 and the check of the operation of the recording portion A and the check of the operation of the recording portion B at step S9 are repeated until any one of the portions becomes operable.

When it is judged at step S9 that the recording portion B can process, the color-side main controlling portion 1$a$ executes substitute image recording process and issues an instruction to the monochrome-side main controlling portion 2$a$ to start a printing process by the recording portion B (step S10). At step S10, the monochrome-side main controlling portion 2$a$ that has received the instruction issues an instruction to the monochrome-side PCU 2$c$ to start the printing process. Even while the monochrome-side PCU 2$c$ is continuing the printing process, the color-side main controlling portion 1$a$ continues to monitor the recording portion A and judges whether the recording portion A is operable (step S11). The criterion at step S11 also is a threshold of one predetermined condition in the recovery determining portion. When the recording portion A still can not operate at step S11, the color-side main controlling portion 1$a$ judges whether the printing job has been finished (step S12). When the printing job has not been finished, the procedure returns to step S11. When the printing job has been finished, the ending process to the recording portion B similar to that of step S8 is executed.

When the recording portion A is judged to be operable at step S11, the color-side main controlling portion 1$a$ executes a recovering process (a process to switch to the recording portion A), issues an instruction to start the printing process to the color-side PCU 1$c$ (step S13), and issues an instruction to stop the printing by the recording portion B to the monochrome-side main controlling portion 2$a$ (step S14). At step S14, the monochrome-side main controlling portion 2$a$ that has received the instruction issues an instruction to stop the printing to the monochrome-side PCU 2$c$. Following step S14, the color-side main controlling portion 1$a$ judges whether the printing job has been finished (step S15). When the printing job has been finished, the ending process similar to that of step S8 is executed.

When the recording portion A is judged to be not operable at step S6, the color-side main controlling portion 1$a$ executes processes of steps S21 to S30 of FIG. 7.

The color-side main controlling portion 1$a$ stops the recording of the recording portion A by issuing a stop instruction to the color-side PCU 1$c$ (step S21), causes the monochrome-side main controlling portion 2$a$ to check whether the recording portion B is operable, obtains the result of the check, and judges whether the recording portion B is currently operable (step S22). The criterion at step S22 also is a threshold of one predetermined condition in the recovery determining portion.

When the recording portion B is judged to be operable at step S22, the color-side main controlling portion 1$a$ issues an instruction to record images by the recording portion B to the monochrome-side main controlling portion 2$a$ (step S23). At step S23, the monochrome-side main controlling portion 2$a$that has received the instruction issues an instruction to start the printing process to the monochrome-side PCU 2$c$. Following step S23, the color-side main controlling portion 1$a$ judges whether the recording portion "A" has recovered (step S24). When the recording portion "A" has been recovered, the color-side main controlling portion 1$a$ issues a stop instruction to the monochrome-side main controlling portion 2$a$ (step S25) and issues a recording start instruction to the color-side PCU 1$c$ to start recording by the recording portion A (step S26). The criterion at step S24 also is a threshold of one predetermined condition in the recovery determining portion. At step S25, the monochrome-side main controlling portion 2$a$ that has received the stop instruction stops the recording by the recording portion B by issuing a stop instruction to the monochrome-side PCU 2$c$. Following step S26, the procedure returns to step S6 to execute further processes.

As a result of the judgment at step S24, when the recording portion A has not recovered, the color-side main controlling portion 1*a* judges whether the printing job has been finished (step S27). When the printing job has not been finished, the procedure returns to step S24. When the printing job is judged to have been finished at step S27, the color-side main controlling portion 1*a* issues to the monochrome-side main controlling portion 2*a* an instruction to execute the ending process to the recording portion B (step S28). At step S28, the monochrome-side main controlling portion 2*a* that has received the instruction issues an instruction to execute the ending process to the monochrome-side PCU 2*c* and, thereby, the recording process by the recording portion B is ended.

If it is judged at step S22 that the recording portion B is not operable, it is judged whether the recording portion A is restored as is the case with step S24 (step S29), and if not restored, the procedure goes back to step S22. If it is judged at step S29 that the recording portion A is restored, the recording in the recording portion A is started as is the case with step S26 (step S30), and the procedure goes back to step S6. The criterion at step S29 also is a threshold of one predetermined condition in the recovery determining portion.

Figure 8:
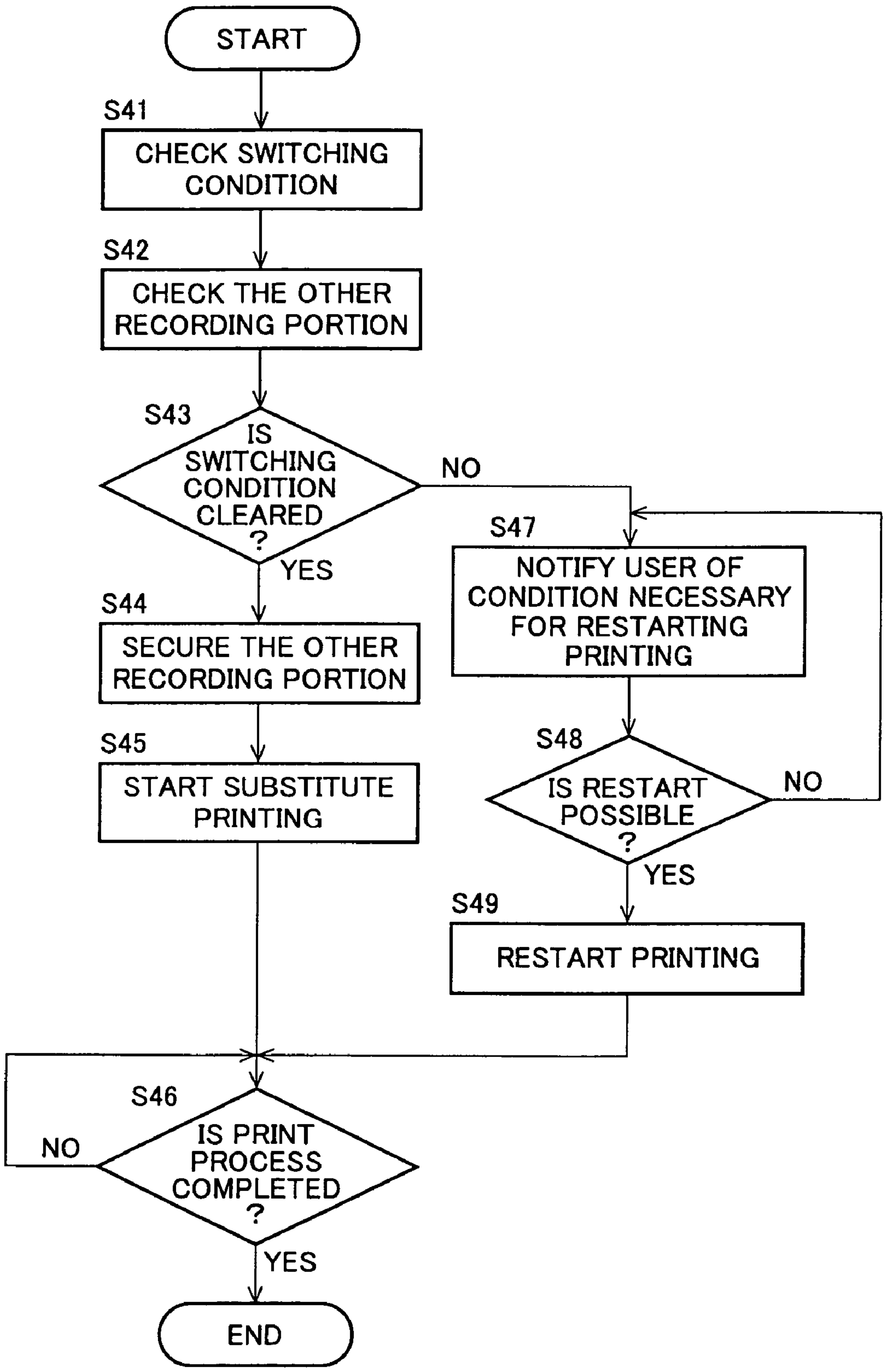
FIG. 8 is an explanatory diagram of an example of a switch checking process that can be applied to the switching and recovering processes of FIGS. 6 and 7.

FIG. 8 is an explanatory diagram of an example of a switch determining process that can be applied to the switching/recovering process of FIGS. 6 and 7. With reference to FIG. 8, description will be made of the switch determining and recovery determining processes, which are the features of the present invention, in terms of the case of executing the substitute image recording process in the recording portion B for the image recording process that should be executed in the recording portion A.

If an event such as a printing interruption occurs, the color-side main controlling portion 1*a* checks the predetermined condition, i.e., a switching condition (step S41). As described in FIGS. 6 and 7, the printing interruption, etc., may be incorporated and processed as the predetermined condition in the present system.

The color-side main controlling portion 1*a* checks the other recording portion B through the monochrome-side main controlling portion 2*a* (step S42) to judge whether the switching condition is cleared (predetermined condition is satisfied) (step S43). The switching condition may accordingly be determined with respect to whether trouble occurs in the recording portion B, whether the amount of task is too much, etc. If the switching condition is satisfied, the color-side main controlling portion 1*a* secures the other recording portion B through the monochrome-side main controlling portion 2*a* (step S44) to start substitute printing (step S45). It is then judged whether the print process is completed, depending on whether execution of a job is terminated, etc., (step S46), and the substitute printing is executed until the completion.

On the other hand, if the switching condition is not cleared at step S43, a user is notified of a condition necessary for restarting the printing through the color-side operating panel 201 and the monochrome-side operating panel 202 (see FIGS. 1 and 2) or an alarm sound (step S47). The color-side main controlling portion 1*a* refers to the predetermined condition in the recovery determining portion to judge whether the restart is possible (step S48), and if the restart is not possible, the procedure goes back to step S47 or the restart is waited. If it is judged that the restart is possible at step S48, the color-side main controlling portion 1*a* issues a print restart instruction to the color-side PCU 1*c* to restart the printing in the recording portion A (step S49) and the procedure goes to step S46.

The above switching/recovering process will be described with reference to FIGS. 9 to 14 by assuming a more specific case. In the present system exemplified in FIGS. 9 to 14, the monochrome image recording apparatus 2 including the monochrome engine and the color image recording apparatus 1 including the color engine are connected being disposed respectively upstream and downstream to each other as described referring to FIGS. 1 to 8.

Figure 9:
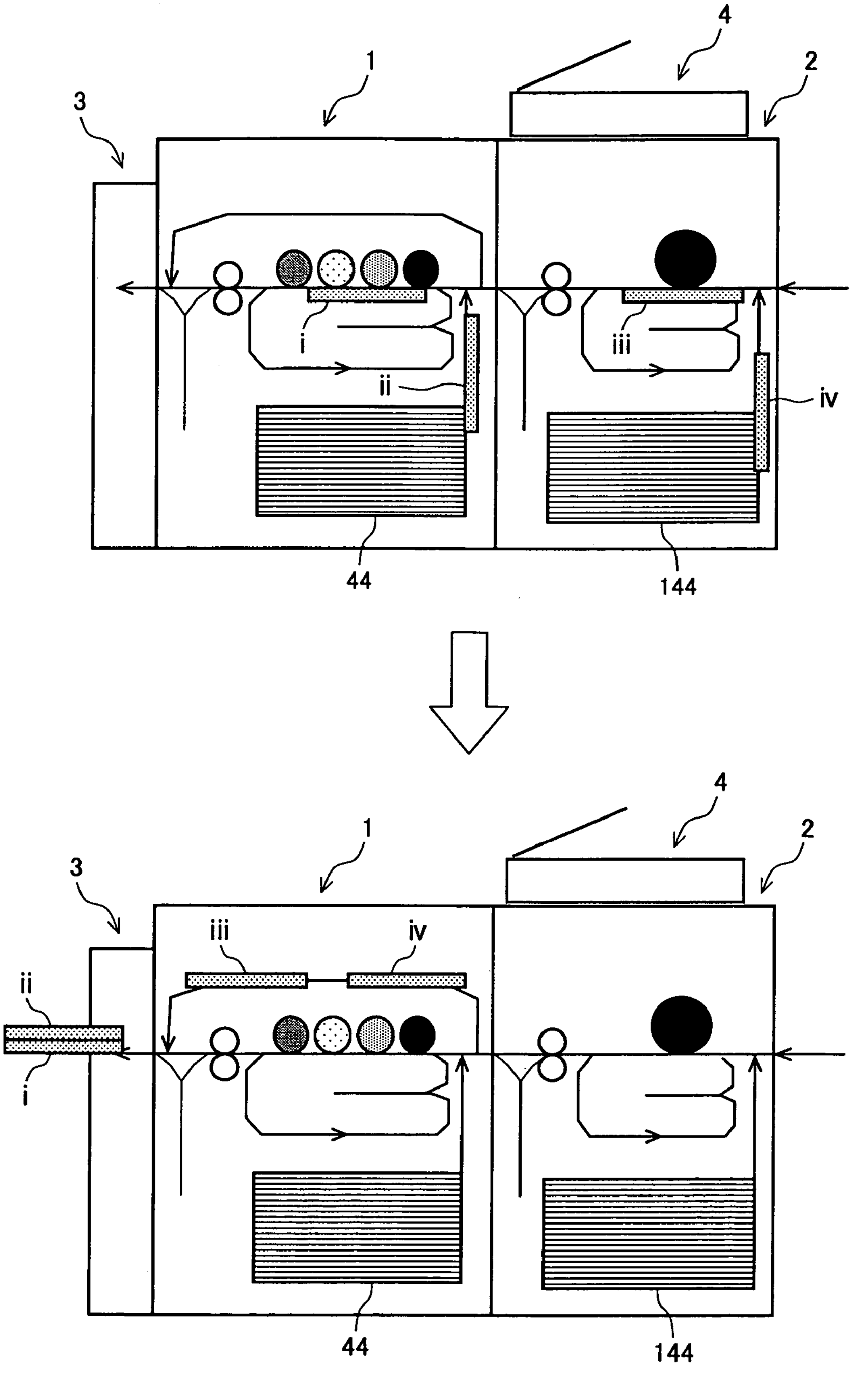
FIG. 9 is an explanatory schematic view of an example of a color engine substituting process for improving FCOT in the image recording system described referring to FIGS. 1 to 8.

FIG. 9 is an explanatory schematic view of an example of a color engine substituting process for improving the FCOT in the image recording system described referring to FIGS. 1 to 8.

Normally, a job only containing the monochrome printing is printed by the upstream monochrome image recording apparatus 2, which has a faster monochrome printing speed. However, the switching determining portion judges whether a predetermined condition is satisfied by the transportation distances to the recorded item containing portion (final processing apparatus 3) of the monochrome image recording apparatus 2 and the color image recording apparatus 1, for example, and if the condition is satisfied, the process switching portion allows the first few sheets of the job to be printed in monochrome by the downstream color engine to improve the FCOT. Conventionally, the paper sheet ejection time of paper sheets iii is FCOT. However, according to the present invention, the paper ejection time of a paper sheet i is FCOT, and therefore the FCOT is improved.

Although the recorded item is received and contained in the recorded item containing portion in the order of the sheets i to iv in the example of FIG. 9, if the sheet ii transported from the fourth recording paper sheet tray 44 on the color side arrives at the recorded item containing portion later than the sheet iii transported from the fourth recording paper sheet tray 144 on the monochrome side, the order is the sheets i, iii, ii, and iv, for example. Although the paper sheet on the side of the color image recording apparatus 1 and the paper sheet on the side of the monochrome image recording apparatus 2 are merged before the final processing apparatus 3, the timing control may be executed as needed such that the sheets do not overlap with each other at the merging point.

In the present system, the distance from one image recording apparatus to the common recorded item containing portion is different from the distance from the other image recording apparatus to the recorded item containing portion because of the layout. Therefore, as illustrated in FIG. 9, it is preferable for the process switching portion to incorporate a threshold of difference of the transporting time from the both image recording apparatuses to the recorded item containing portion as a predetermined condition and to execute the switching only when the predetermined condition is satisfied. It is preferable to execute the switching in consideration of not only the transporting time difference, but also the speed of the image recording. That is, since the color image recording apparatus 1 and the monochrome image recording apparatus 2 have different image recording speeds, it is therefore preferable for the process switching portion to incorporate a threshold of difference of the image recording speeds of the both image recording apparatuses as a predetermined condition and to execute the switching only when the predetermined condition is satisfied. Although it is of course preferable to consider both conditions and finally execute the switching based on the recorded item arrival time, the switching may be executed in consideration of only the transporting time difference or the image recording speed difference, and in such a case, the timing control may be executed such that the paper sheets are prevented from overlapping with each other at the merging point.

Figure 10:
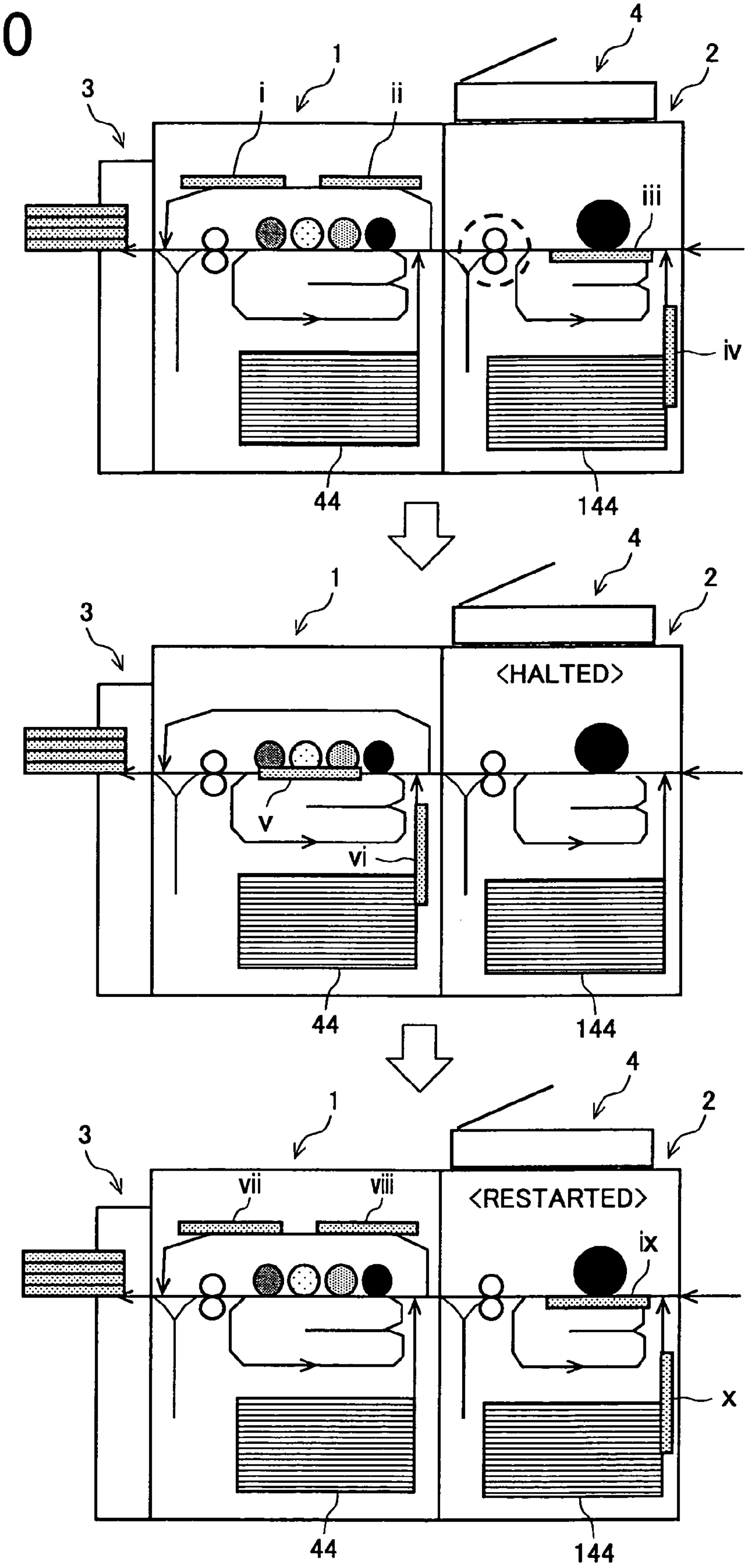
FIG. 10 is an explanatory schematic view of an example of a color engine substituting process executed when the fuser temperature is decreased in the image recording system described referring to FIGS. 1 to 8.

FIG. 10 is an explanatory schematic view of an example of a color engine substituting process executed when the fuser temperature is decreased in the image recording system described referring to FIGS. 1 to 8.

Although a job only containing the monochrome printing is normally printed by the monochrome engine of the monochrome image recording apparatus 2, which has a faster monochrome printing speed, and the paper sheets are ejected in the order of the paper sheets i to iv, if the switching determining portion judges that a temperature is lower than a certain value in the fuser (a portion indicated by a dotted circle in FIG. 10) of the monochrome engine and that a halt is needed to recover the temperature, the process switching portion allows the color engine of the color image recording apparatus 1 to perform the monochrome printing and take over a portion of the job until the temperature is recovered. The recovery determining portion monitors whether the temperature is recovered and, if the predetermined condition for the recovery is satisfied, the process is recovered to the process at the monochrome engine by the recovery by the process recovering portion.

That is, during the halt, the paper sheets v, vi are transported from the fourth recording paper sheet tray 44 on the color side, printed by the color engine, and ejected to the final processing apparatus 3. On the other hand, after the restart, the paper sheets ix, x are sequentially transported from the fourth recording paper sheet tray 144 on the monochrome side, printed by the monochrome engine, and ejected to the final processing apparatus 3. After the restart, the timing control may be executed as needed such that the paper sheets do not overlap with each other at the merging point. If it is judged that a halt is needed during the printing of the sheet iii (during image formation), the sheet iii may be ejected from another tray, or the sheet iii can be ejected as usual by setting the temperature threshold (certain value) to the extent that the fixing can be performed without problems for a sheet that is being printed.

As above, it is preferable for the process switching portion that the predetermined condition in the switching determining portion includes a condition that the recording in one image recording apparatus can be continued. As a result, if the image recording is stopped when the recorded item is being outputted from one image recording apparatus toward the recorded item containing portion, the other image recording apparatus can output the same recorded item.

Whether recording can be continued may be judged based on whether output of the same recorded item (recording of an image, recording with the quality) can be guaranteed also in the other image recording apparatus. This case corresponds to including that output of the same recorded item can be guaranteed also in the other image recording apparatus, in the conditions as the predetermined conditions in the switching determining portion.

In the example of FIG. 10, the present system is adapted to include a heat source to fuse the toner (developing agent) on a recording material as a recorded item and to stop temporarily the recording of an image due to degradation of the fusing ability of the heat source. However, in addition, cases where the output of the same recorded item is impossible and, otherwise, the cases where the recording is impossible are present.

For example, as exemplified at steps S6, S22, etc., of FIGS. 6 and 7, the present system may be adapted to judge whether processing can be continued based on whether supplies (toner and paper sheets) necessary for outputting as recorded items in the image recording apparatuses are lacking. This case corresponds to including that the supplies necessary for one image recording apparatus (on the side that is to start processing) are not lacking, in the conditions as the predetermined conditions in the switching determining portion. The “lack of the supplies” is defined to include shortage from the viewpoint of the stable supply. That is, the present system may be adapted to judge whether the printing can be continued based on whether ink or toner that record and reproduce an image on a recorded item can be stably supplied and, for example, to stop temporarily the recording of an image according to degradation of the reproducing ability of the developing agent (under-toner).

The case is present where a paper sheet that can not be transported out of the other image recording apparatus side is present such as the case where a color paper sheet is necessary. Therefore, the case where a recording material necessary for the recording of an image can also not be supplied is considered to be the case where output of the same recorded item can not be guaranteed. To cope with such a case, the present system may be adapted to include that recording materials necessary for recording can also be supplied in the other image recording apparatus as one of the predetermined conditions. Another case where output of the same recorded item can not be guaranteed can include the case where stable operation of the other image recording apparatus can not be guaranteed. To cope with such a case, the present system may be adapted to include that stable operation of the other image recording apparatus can be guaranteed as one of the predetermined conditions.

If the execution of the switching is judged in accordance with the recorded item arrival time, it is preferable to consider congestion of jobs in the other image recording apparatus as above. Therefore, it is preferable that the predetermined condition in the switching determining portion includes a condition that other print jobs are not in a stagnation state in the other image recording apparatus. In this case, the process switching portion executes the switching to the substitute image recording process when other print jobs are not in a stagnation state in the other image recording apparatus. That is, in this form, the switching is determined to be executed/not executed after checking the stagnation situation of other print job (after checking that the image recording can be executed smoothly).

The recovering process of FIG. 10 is executed by the process recovering portion. After the process switching portion executes the switching, the process recovering portion recovers the image recording process from the substitute image recording process in the other image recording apparatus as above. The recovery determining portion determines whether the recovery is executed by the process recovering portion, depending on whether the predetermined condition is satisfied.

Predetermined conditions in the recovery determining portion may basically be same as the predetermined conditions in the switching determining portion (however, the target of judgment and determination is an image recording apparatus that is not the image recording apparatus concerning the switching), and the detailed description thereof is omitted. For example, the guarantee of the output of the same recorded items by the recovery determining portion may include that the recording material necessary to the recording of the image can also be supplied in the image recording apparatus on the side that executes the image recording process, or may include that the stable operation of the image recording apparatus on the side that executes the image recording process can be guaranteed.

The process recovering portion may determine whether to recover based on the number of remaining sheets of a job.

That is, a sheet-number detecting portion that detects the number (or an approximate number) of sheets to execute the image recording process is provided to a sending-out tray (the original document mounting tray 40 in FIG. 1, etc.) of the color image reading apparatus 4 in the present system. The sheet-number detecting portion may be a portion that analyzes the received job, etc.

The recovery determining portion may be adapted to first obtain the number of remaining sheets based on the number of sheets detected by the sheet-number detecting portion and to obtain the number of remaining sheets to be processed, and that the number of remaining sheets to be processed is equal to or larger than the predetermined number of sheets is included in the conditions as the predetermined conditions. The case where the recovery to the image recording process slows the processing when the number of remaining sheets is few, etc., is actually present. However, with such a configuration, only when the number of remaining sheets is equal to or larger than the predetermined number of sheets, recovery of the image recording process from the substitute image recording process can be executed.

Figure 11:
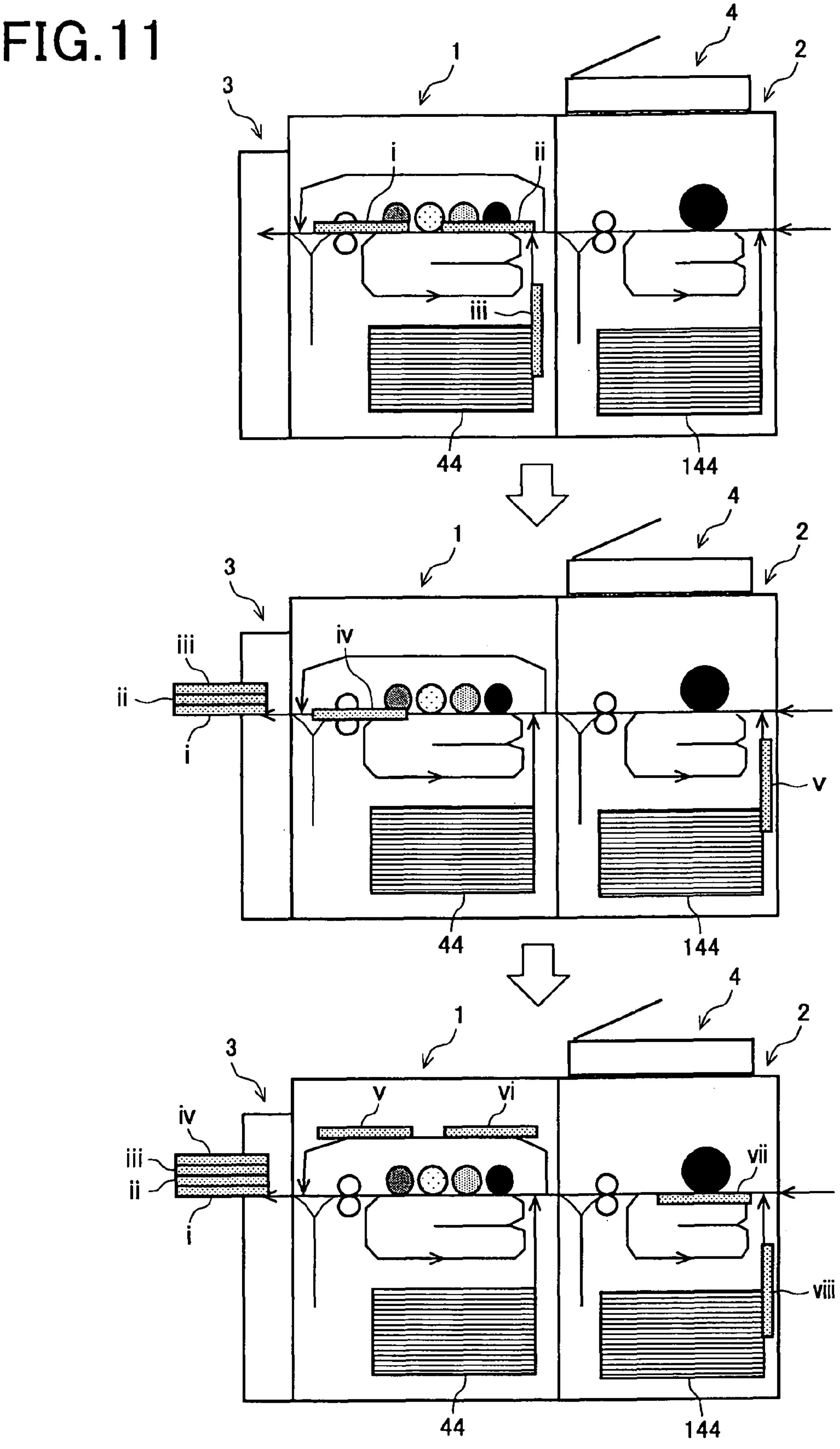
FIG. 11 is an explanatory schematic view of an example of a color engine substituting process for improving the productivity during warming up in the image recording system described referring to FIGS. 1 to 8.

FIG. 11 is an explanatory schematic view of an example of the color engine substituting process for improving the productivity during warming up in the image recording system described referring to FIGS. 1 to 8.

Usually, a job containing monochrome printing only is printed by the monochrome engine of the monochrome image recording apparatus 2 that has the higher monochrome printing speed. When the switching determining portion judges that the color engine has completed the warming up thereof earlier during the starting up of the power source or recovery from an energy-saving mode, in the process switching portion, the color engine of the color image recording apparatus 1 monochrome-prints and ejects the paper sheets to the final processing apparatus 3 in order of the sheets i to iv until the monochrome engine is warmed up. When the monochrome engine is judged to become ready during the recording of the paper sheet iv, etc., by the recovery determining portion, the process recovering portion switches to the monochrome engine that has the higher speed and the monochrome engine prints the paper sheets V to Viii and ejects the paper sheets to the final processing apparatus 3.

As above, it is preferable that the process switching portion executes the switching based on the time respectively necessary for the two image recording apparatuses, at the time when the apparatuses start to execute the image recording process, to be warmed up. When one image recording apparatus is started up, the time necessary for warming up may surely be calculated as zero. The predetermined condition in this case may be that the difference in the time necessary for completion of the warming up between the two image recording apparatuses at the time when the apparatuses start to execute the image recording process is equal to or longer than predetermined time. In practice, the predetermined time may be determined considering the above image recording speed and the transporting time. Due to the above configuration, while one image recording apparatus is preparing for recording (warming up), the other image recording apparatus on standby (prepared for starting the recording) can output the similar recorded item.

Figure 12:
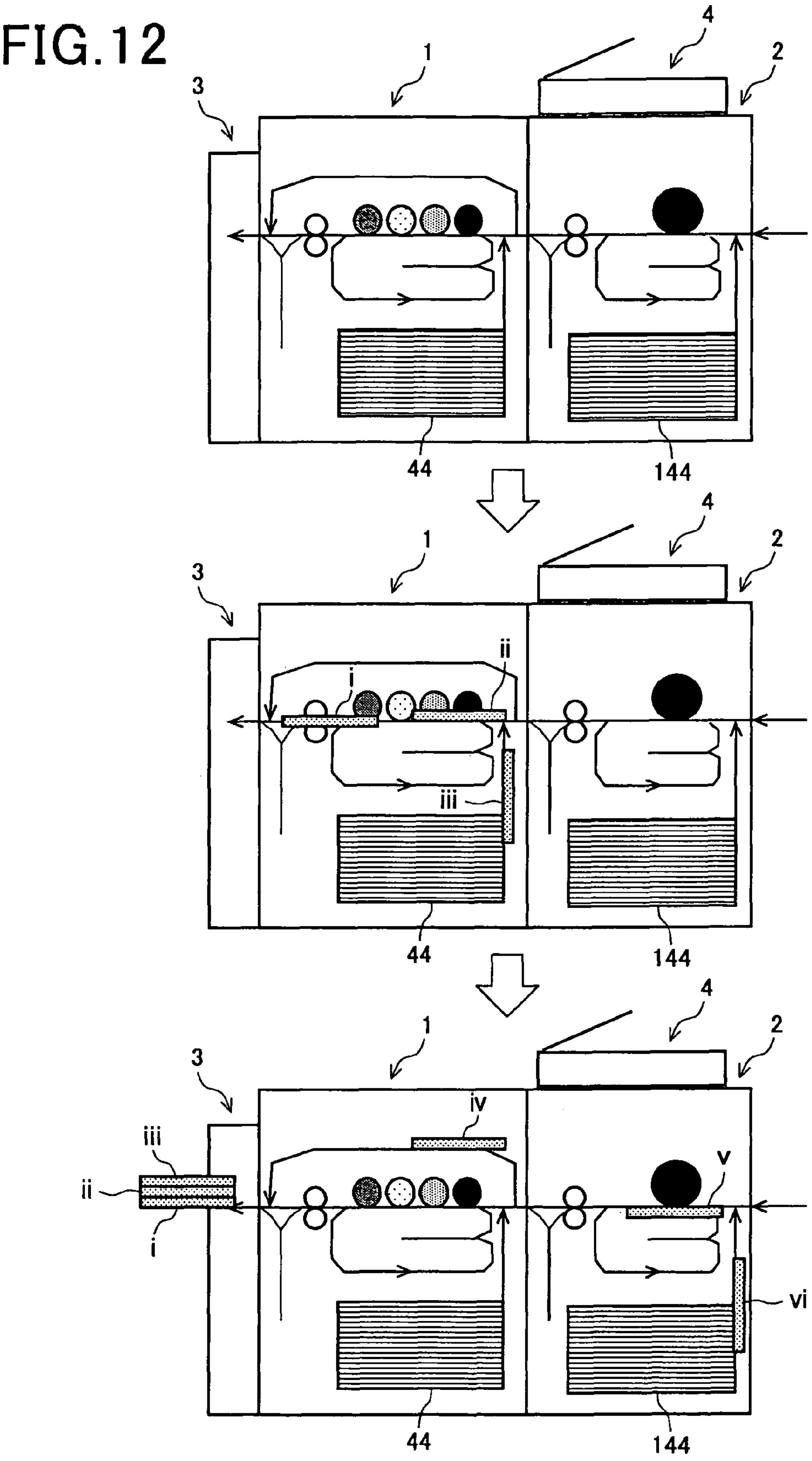
FIG. 12 is an explanatory schematic view of an example of a selecting process of a warm-up-priority engine in the image recording system described referring to FIGS. 1 to 8.

FIG. 12 is an explanatory schematic view of an example of a selecting process of a warm-up-priority engine in the image recording system described referring to FIGS. 1 to 8.

In the present system, it is preferable that warming up of one image recording apparatus of the color image recording apparatus 1 and the monochrome image recording apparatus 2 is executed with priority. In practice, in an image recording system configured by connecting a monochrome engine and a color engine, the same processing as that described referring to FIG. 11 is possible by warming up either one engine with priority. This is to utilize effectively the limited power source capacity and either one engine may precede in warming up thereof with priority manually or automatically. An engine used most frequently may be automatically selected for warming up.

FIG. 12 shows an example that is set such that the color engine in the color image recording apparatus 1 precedes in warming up. The color engine is first warmed up (the upper portion of FIG. 12) and, after the color engine becomes ready, the monochrome engine is warmed up (the middle portion of FIG. 12). At this time, a color job, if any, can be executed by the color engine. After warming up of the monochrome engine is completed, a monochrome job can finally be executed (the lower portion of FIG. 12). When a monochrome job is entered under the state shown in the upper portion of FIG. 12, the same processing as that of FIG. 11 is executed.

When the present system is energized, the color image recording apparatus 1 is first started up and, after the starting up is completed, the monochrome image recording apparatus 2 is started up. The reason why this procedure is taken is as follows. That is, the present system includes the color image recording apparatus 1 and the monochrome image recording apparatus 2 and, if both of the apparatuses are simultaneously started up when the present system is energized, an excessive inrush current would flow at the moment of the starting up. Therefore, the color image recording apparatus 1 is first started up and, after the completion of the starting up of the color image recording apparatus 1, the monochrome image recording apparatus 2 is started up. Thereby, the two image recording apparatuses are started up not simultaneously and the excessive inrush current is prevented from flowing at the moment of the starting up of each apparatus. Together with the prevention of the excessive inrush current, improvement of the performance as the present system is facilitated by starting up the color image recording apparatus 1 capable of both recording of color images and recording of monochrome images prior to the monochrome image recording apparatus 2 capable of only recording of monochrome images.

Figure 13:
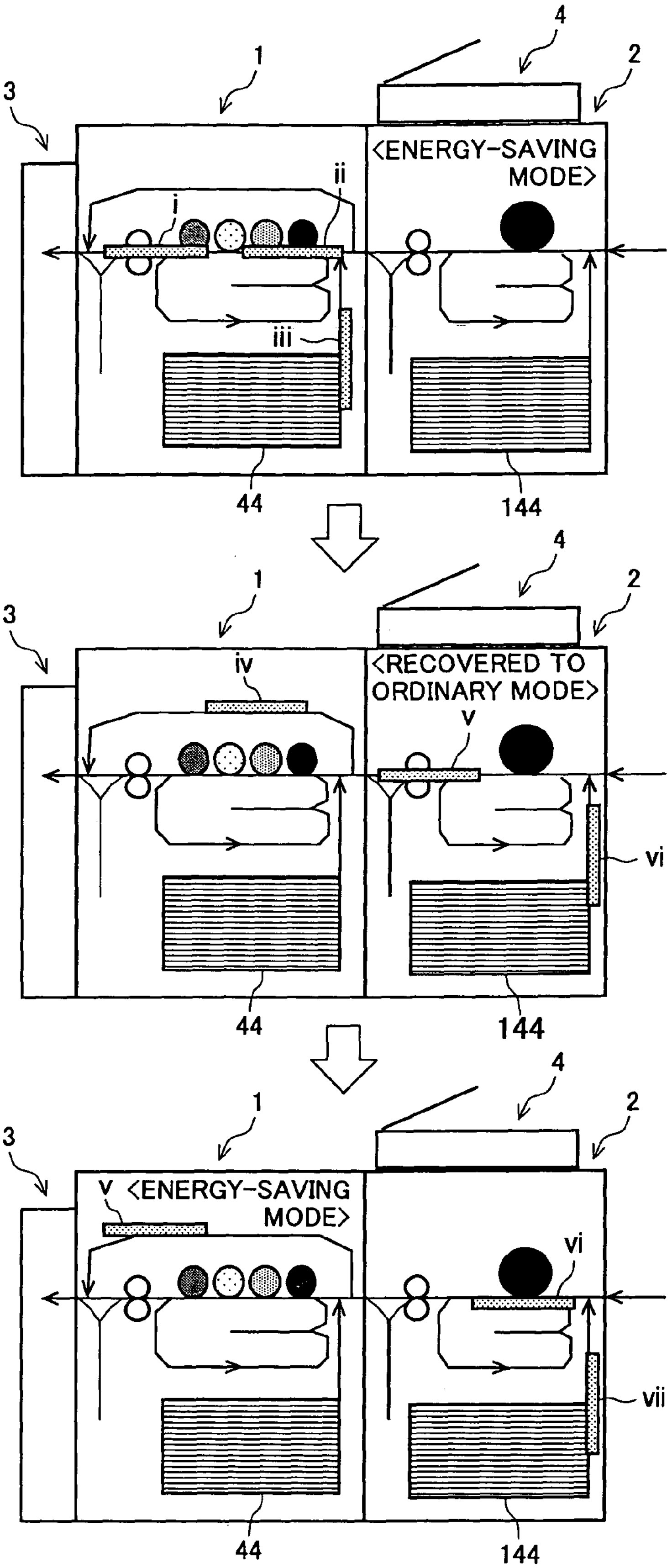
FIG. 13 is an explanatory schematic view of an example of energy-saving-mode entry and recovering processes for each engine in the image recording system described referring to FIGS. 1 to 8.

FIG. 13 is an explanatory schematic view of an example of energy-saving-mode entry and recovering processes for each engine in the image recording system described referring to FIGS. 1 to 8.

In the present system, it is preferable that each engine, that is, each image recording apparatus independently enters an energy-saving mode and each engine independently recovers from the energy-saving mode. Because use of the engines may be biased toward one engine, the energy consumption efficiency is improved by separating the control of the energy-saving mode. In the present system, the switching process and the recovering process of the present invention function effectively for transition to the energy-saving mode and recovery to an ordinary mode.

As shown in the upper portion of FIG. 13, the monochrome image recording apparatus 2 is adapted to enter the energy-saving mode when no job is present for a certain time period in the monochrome engine of the monochrome image recording apparatus 2. At this time, the color engine of the color image recording apparatus 1 executes color printing to the paper sheets i to iii for a color job and ejects the paper sheets to the final processing apparatus 3. As shown in the middle portion of FIG. 13, when a job arrives at the monochrome engine, the monochrome engine recovers from the energy-saving mode, executes monochrome printing to the paper sheets iv to vii, and ejects the paper sheets to the final processing apparatus 3. In contrast, when no job is present for a certain time period in the color engine, as shown in the lower portion of FIG. 13, the color engine of the color image recording apparatus 1 is entered into the energy-saving mode. However, the bypass transporting path apparatus 5, etc., are driven to transport the recorded items with monochrome-printed characters thereon.

As above, in the present system, the monochrome image recording apparatus 2 (and the color image recording apparatus 1) enters a power-saving mode that stops supply of the power to a portion of the monochrome image recording apparatus 2 (and the color image recording apparatus 1) under a specific condition. By executing this, a power-saving effect in the present system is facilitated. Together with the power-saving effect, improvement of the performance as the present system is facilitated by enabling the color image recording apparatus 1 to cope with both of color jobs and monochrome jobs by causing the monochrome image recording apparatus 2 capable of recording only monochrome images to first enter the power-saving mode state, instead of the color image recording apparatus 1 capable of recording both color images and monochrome images.

Figure 14:
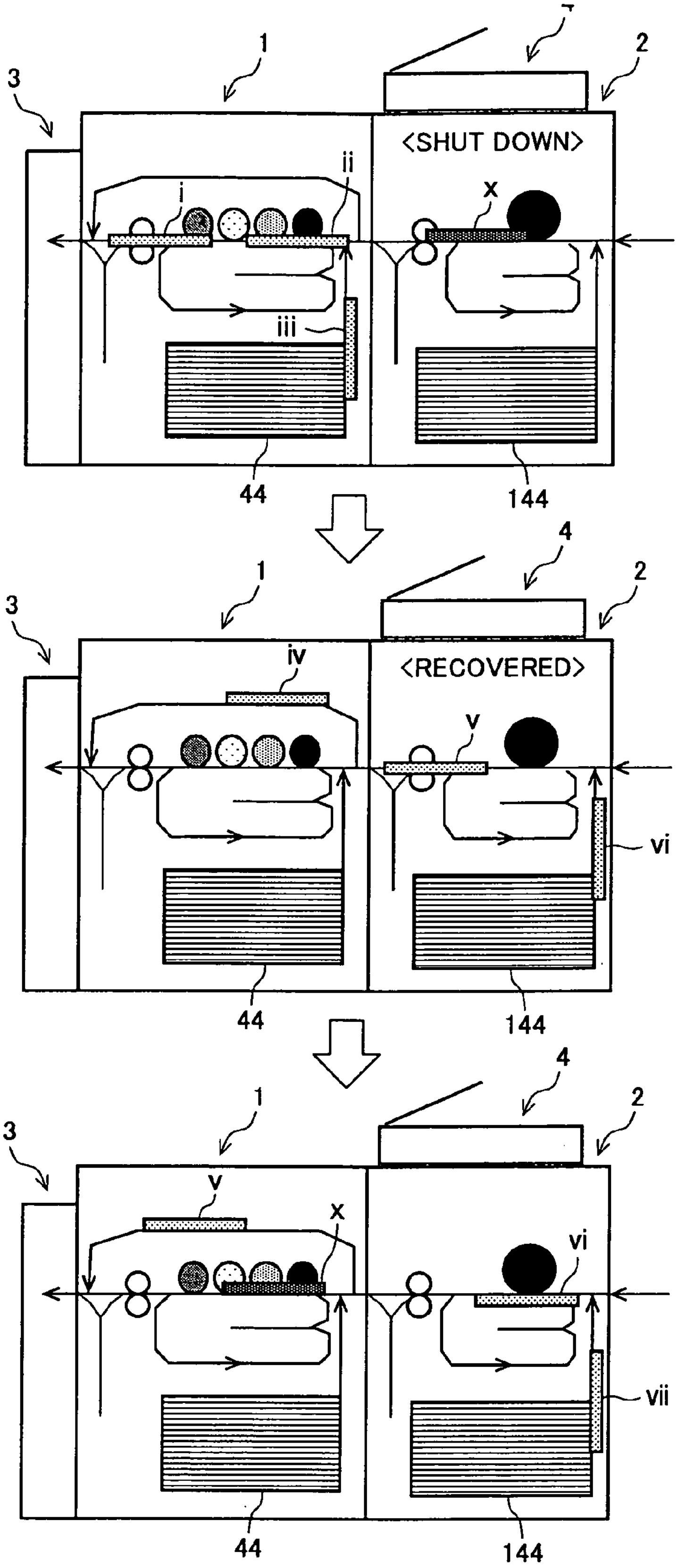
FIG. 14 is an explanatory schematic view of an example of a trouble shutting-down and a trouble recovering processes for each engine in the image recording system described referring to FIGS. 1 to 8.

FIG. 14 is an explanatory schematic view of an example of a trouble shutting-down and a trouble recovering processes for each engine in the image recording system described referring to FIGS. 1 to 8.

In the present system, it is preferable to execute shutdown due to a trouble and recovery from a trouble for each engine, that is, each image recording apparatus. Conventionally, when a trouble has arisen, the entire engine shuts down and the engine can be utilized more effectively and the productivity is improved. In the present system, the switching process and the recovering process of the present invention function effectively by separating for each apparatus the shutdown and the recovery due to a trouble.

As shown in the upper portion of FIG. 14, when a trouble has arisen in the monochrome engine of the monochrome image recording apparatus 2, though the monochrome engine shuts down, the color engine does not shut down because the color engine is not influenced. Therefore, the color engine can execute the job at this time, executes color printing or monochrome printing to the paper sheets i to iii, and ejects the paper sheets to the final processing apparatus 3. As shown in the middle and the lower portions of FIG. 14, when the monochrome engine has recovered from the trouble, on arrival of a job at the monochrome engine, the monochrome engine executes monochrome printing to the paper sheets iv to vii and ejects the paper sheets to the final processing apparatus 3. The paper sheets x shown in the upper portion of FIG. 14 are the cause of the trouble, are not ejected to the final processing apparatus 3, and may be ejected to another ejection tray or may be ejected to the final processing apparatus 3 after the entire job has been completed.

As above, the description has been given assuming that the main controlling portion 1*a* of the color-side controlling portion includes the controlling functions necessary for the present system such as switching and recovering (including the determining process). However, these controlling function necessary for the present system may be provided to the main controlling portion 2*a* of the monochrome-side controlling portion. The processing of the main controlling portion 2*a* in this case can be described utilizing the description for the color-side main controlling portion 1*a* and, therefore, the description is omitted.

The controlling functions necessary for the present system such as switching and recovery may be provided to both of the monochrome-side controlling portion (the monochrome-side main controlling portion 2*a*, etc.) and the color-side controlling portion (the color-side main controlling portion 1*a*, etc.).

That is, the controlling portion of the color image recording apparatus 1 may include a monitoring portion that monitors the monochrome image recording apparatus 2 through the controlling portion of the monochrome image recording apparatus 2, and the process switching portion and the switching determining portion, or the process switching portion and the switching determining portion as well as the process recovering portion and the recovery determining portion. The controlling portion of the monochrome image recording apparatus 2 may include a monitoring portion that monitors the color image recording apparatus 1 through the controlling portion of the color image recording apparatus 1, and the process switching portion and the switching determining portion, or the process switching portion and the switching determining portion as well as the process recovering portion and the recovery determining portion.

The color-side main controlling portion 1*a* is incorporated executably with a program to cause a computer including the CPU in the main controlling portion 1*a*, a RAM as a working area, the ROM, etc., to function as the monitoring portion, the process switching portion and the switching determining portion, or the monitoring portion, the process switching portion and the switching determining portion as well as the process recovering portion and the recovery determining portion, and the monochrome-side main controlling portion 2*a* is incorporated executably with a program to cause a computer including the CPU in the main controlling portion 2*a*, a RAM as a working area, the ROM, etc., to function as the monitoring portion, the process switching portion and the switching determining portion, or the monitoring portion, the process switching portion and the switching determining portion as well as the process recovering portion and the recovery determining portion. Thereby, the processes such as monitoring, switching, and recovering by the respective portions can be realized.

The controlling functions necessary for the present system such as switching and recovering may be provided to the controlling portion in the bypass transporting apparatus 5 or the transporting path connecting apparatus 6 instead of the monochrome-side controlling portion and the color-side controlling portion.

That is, a common controlling portion may be provided that is incorporated into a housing such as a housing disposed between the color image recording apparatus 1 and the monochrome image recording apparatus 2 and controls both of the controlling portion of the color image recording apparatus 1 and the controlling portion of the monochrome image recording apparatus 2 as the process switching portion and the switching determining portion as well as the process recovering portion and the recovery determining portion.

The common controlling portion is incorporated executably with a program to cause a computer including a CPU in the common controlling portion, a RAM as a working area, a ROM, etc., to function as the process switching portion and the switching determining portion as well as the process recovering portion and the recovery determining portion and, thereby, the processes such as switching and recovering by the respective portions can be realized.

Figure 15:
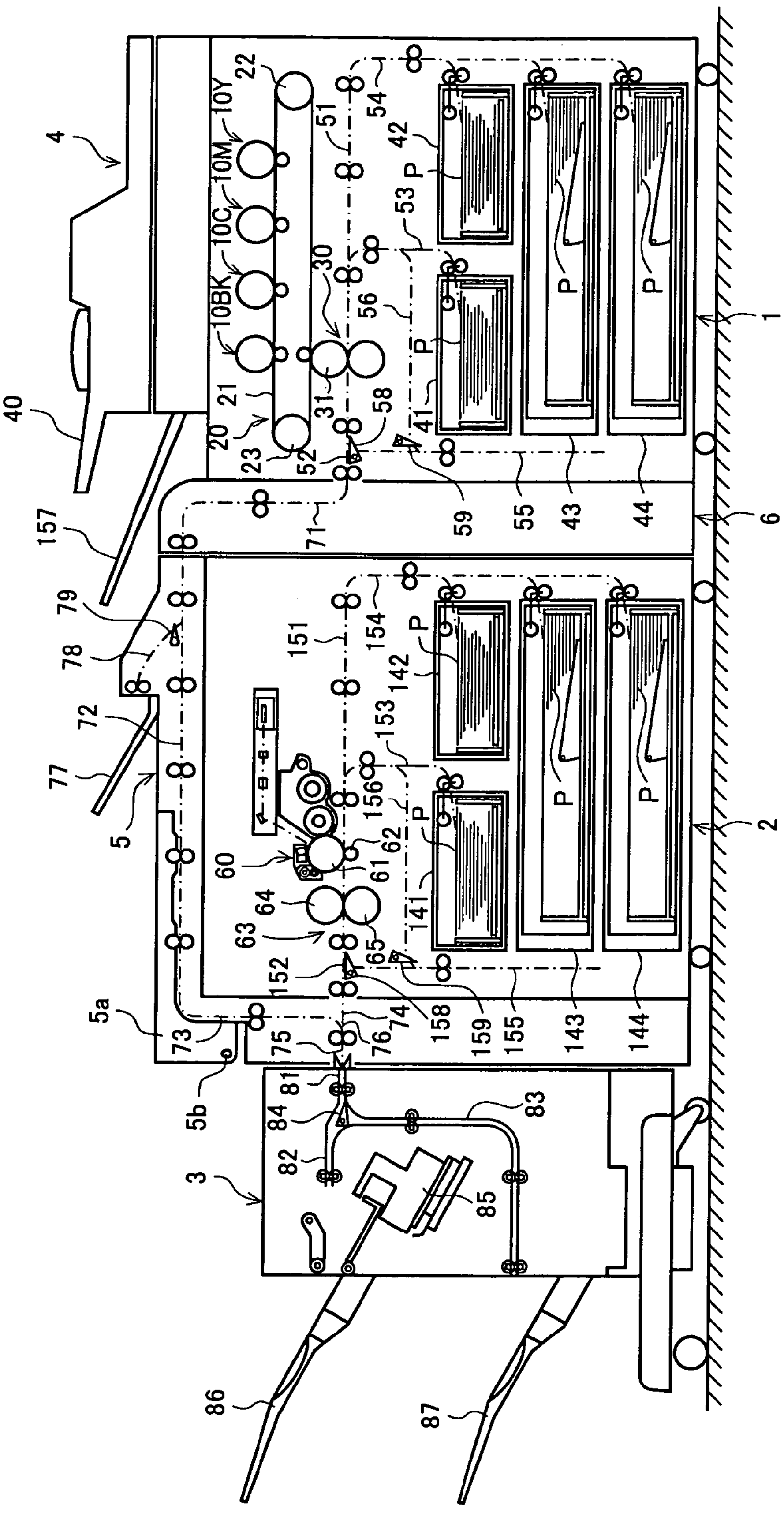
FIG. 15 is a schematic cross-sectional view of an example of the configuration of an image recording system according to another embodiment of the present invention.
Figure 16:
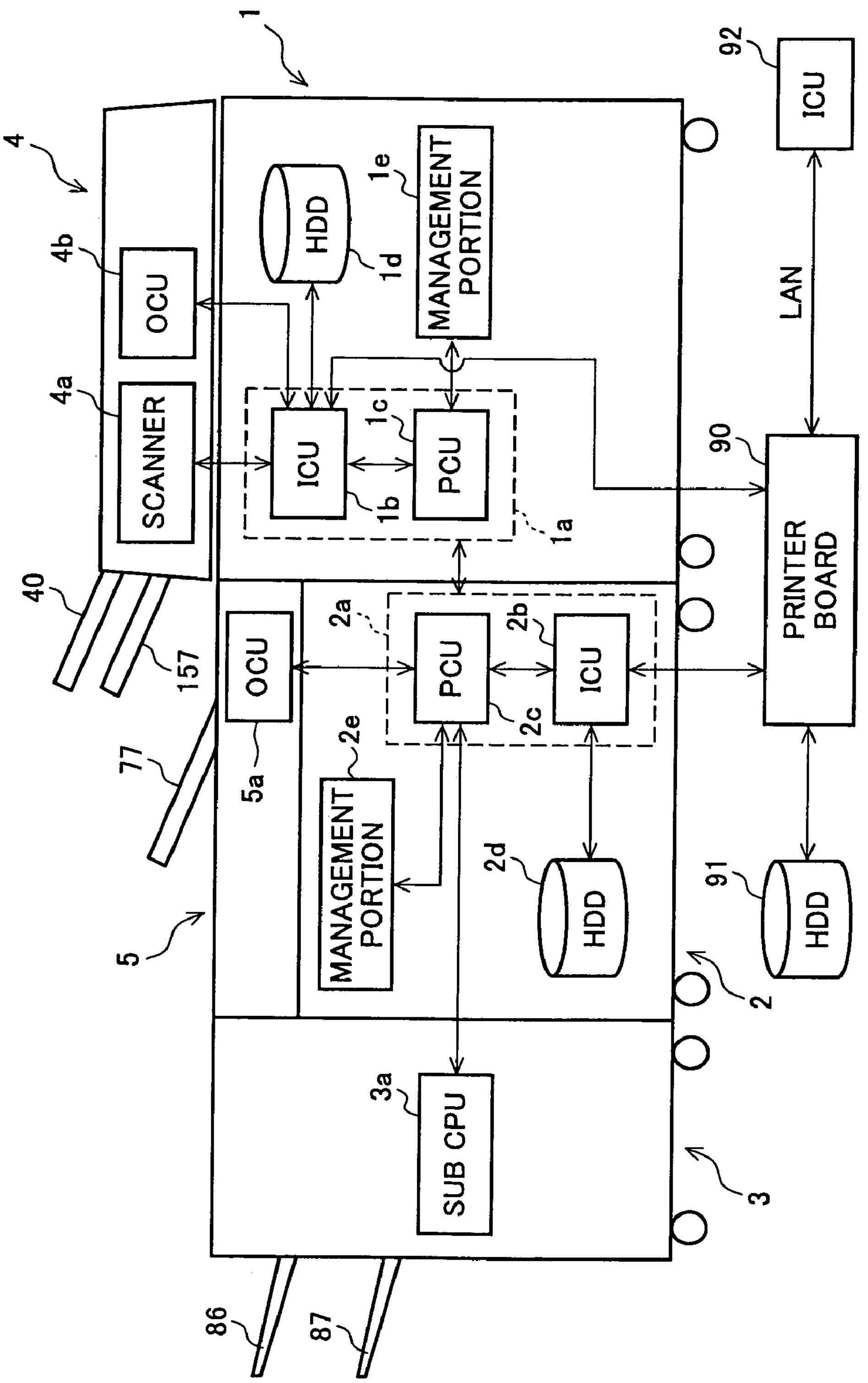
FIG. 16 is a block diagram of an example of the main part that executes image recording control in the image recording system of FIG. 15.

FIG. 15 is a schematic cross-sectional view of an example of the configuration of an image recording system according to another embodiment of the present invention. FIG. 16 is a block diagram of an example of the main portion that executes image recording control in the image recording system of FIG. 15. Referring to FIGS. 15 and 16, as an example of the system configuration replacing the image recording system of FIGS. 3 and 5, an example formed by exchanging disposition of the color image recording apparatus 1 and the monochrome image recording apparatus 2 of the image recording system of FIGS. 3 and 5 is shown. Therefore, the portions overlapping those in the description referring to FIGS. 3 and 5 are given the same reference numerals and the detailed description thereof is basically omitted.

The present system exemplified in FIG. 15 comprises a monochrome image recording apparatus 2 disposed on the center part, a final processing apparatus 3 disposed on the front side (on the left in the figure) of the monochrome image recording apparatus 2, a color image recording apparatus 1 disposed in the back side (on the right in the figure) of the monochrome image recording apparatus 2, and a color image reading apparatus (color scanner) 4 mounted on the upper portion of the color image recording apparatus 1.

A bypass transporting path apparatus 5 having an inversed L-shape as a side view is disposed such that the apparatus 5 covers over the monochrome image recording apparatus 2 from the front portion to the upper portion of the monochrome image recording apparatus 2. A transporting path connecting apparatus 6 having a housing shape is disposed between the front portion of the color image recording apparatus 1 and the back portion of the monochrome image recording apparatus 2. An upper containing tray 77 is provided above the bypass transporting path apparatus 5. The front portion of the color image recording apparatus 1 is connected with the back portion of the monochrome image recording apparatus 2 through the transporting path connecting apparatus 6. The front portion of the color image recording apparatus 1 is connected with the back portion of the final processing apparatus 3 through the bypass transporting path apparatus 5.

That is, the present system exemplified in FIG. 15 is configured by connecting in series from the front to the back the final processing apparatus 3, the bypass transporting path apparatus 5, the monochrome image recording apparatus 2, the transporting path connecting apparatus 6, and the color image recording apparatus 1. The upper portion of the monochrome image recording apparatus 2 is occupied by the bypass transporting path apparatus 5 having the upper containing tray 77. The upper portion of the color image recording apparatus 1 has no bypass transporting path apparatus and is occupied by the color image reading apparatus 4.

The present system may also be configured by disposing the above monochrome image recording apparatus 2 and color image recording apparatus 1 side by side, providing a recorded item containing portion (or common containing portion) that contains commonly recording media that are recorded (recorded items) to each image recording apparatus, and providing a dedicated containing portion that contains dedicatedly recorded items of the color image recording apparatus 1 (exemplified with the upper containing tray 77 provided above the bypass transporting path apparatus 5) to the above color image recording apparatus 1 such that the dedicated containing portion and the above common containing portion are selectively used.

By configuring as above, the present system can be configured to contain the recorded items of the color image recording apparatus 1 and the recorded items of the monochrome image recording apparatus 2 together in the common containing portion during distributed processing that uses in parallel the color image recording apparatus 1 and the monochrome image recording apparatus 2. The present system can also contain the recorded items of the monochrome image recording apparatus 2 in the common containing portion during monochrome-apparatus-alone processing that uses singly the monochrome image recording apparatus 2. The present system can also contain the recorded items of the color image recording apparatus 1 in the dedicated containing portion during color-apparatus-alone processing that uses singly the color image recording apparatus 1. Thereby, parallel processing of two image recording jobs can be executed smoothly.

The configuration of each of the apparatuses will be described simply.

As shown in FIG. 15, the color image recording apparatus 1 comprises four image forming units 10BK, 10C, 10M, and 10Y, an intermediate transferring unit 20, a transfer fusing unit 30, a first recording paper sheet containing tray 41, a second recording paper sheet containing tray 42, a third recording paper sheet containing tray 43, a fourth recording paper sheet containing tray 44, a horizontal feed transporting path 51, a horizontal ejection transporting path 52, a first vertical transporting path 53, a second vertical transporting path 54, a third vertical transporting path 55, a horizontal return transporting path 56, and an ejection containing tray 157 that contains recording paper sheets of color images that have been image-processed. The color image recording apparatus 1 employs any tandem scheme such as the one described above with referring to FIG. 4, etc., as a method of recording a color image on the recording paper sheet P that is a recording medium.

In the above color image recording apparatus 1, a transporting path to transport the recording paper sheets P is configured as follows. That is, recording of characters and figures onto the recording paper sheets P is executed by the transfer fusing nip formed by the contact of the transfer fusing roller 31 and the pressure roller 32 of the transfer fusing unit 30 and, therefore, the recording paper sheet P needs to be transported to the transfer fusing nip. Therefore, the horizontal feed transporting path 51 that transports and feeds the recording paper sheet P to the transfer fusing nip is formed such that the path 51 extends horizontally from the transfer fusing nip of the transfer fusing unit 30 to the back. The horizontal ejection transporting path 52 that transports and ejects the recording paper sheet P from the transfer fusing nip is formed such that the path 52 extends horizontally from the transfer fusing nip of the transfer fusing unit 30 to the front. The horizontal ejection transporting path 52 is connected with the back portion of the bypass transporting path apparatus 5 described later, and is connected with the final processing apparatus 3 described later through this bypass transporting path apparatus 5.

The monochrome image recording apparatus 2 in FIG. 15 will be described. The monochrome image recording apparatus 2 records monochrome characters, figures, etc., onto the recording paper sheets P. In FIG. 15, the monochrome image recording apparatus 2 comprises a monochrome image forming unit 60, a fusing unit 63, a first recording paper sheet containing tray 141, a second recording paper sheet containing tray 142, a third recording paper sheet containing tray 143, a fourth recording paper sheet containing tray 144, a horizontal feed transporting path 151, a horizontal eject transporting path 152, a first vertical transporting path 153, a second vertical transporting path 154, a third vertical transporting path 155, a horizontal return transporting path 156, and an ejection containing tray 77. The ejection containing tray 77 is a tray that contains recording paper sheets of color images image-processed by the color image recording apparatus 1 in the back (however, the sheets are usually contained in the common containing portion).

The above monochrome image recording apparatus 2 can be configured by replacing the transfer fusing unit 30 in the above color image recording apparatus 1 with the photosensitive drum 61 and the pressure roller 62. That is, the configuration and the disposition of recording paper sheet containing trays that contain the recording paper sheets P and transporting paths that transport the recording paper sheets P in the above monochrome image recording apparatus 2 are completely same as those of the recording paper sheet containing trays and the transporting paths of the above color image recording apparatus 1. Therefore, description for these is omitted. However, different from the color image recording apparatus 1, the horizontal eject transporting path 152 of the monochrome image recording apparatus 2 is connected with the front portion of the bypass transporting path apparatus 5 described later and is connected with the final processing apparatus 3 described later through this portion. In FIG. 15, the parts concerning the recording paper sheet containing trays that contain the recording paper sheets P and the transporting paths that transport the recording paper sheets P in the monochrome image recording apparatus 2 are denoted by numerals in 100s and the lower two digits of these numerals are same as the numerals of the corresponding parts in the color image recording apparatus 1.

The transporting path connecting apparatus 6 in FIG. 15 will be described. The transporting path connecting apparatus 6 is used attached to the front portion of the color image recording apparatus 1 and has a function of transporting the recording paper sheets P transported by the horizontal eject transporting path 52 of the color image recording apparatus 1 to the back end of the bypass transporting path apparatus 5 attached to the monochrome image recording apparatus 2.

Therefore, the transporting path connecting apparatus 6 is provided with a bypass ascending transporting path 71. The back end of the bypass ascending transporting path 71 is connected with the front end of the horizontal eject transporting path 52 of the color image recording apparatus 1. The bypass ascending transporting path 71 has the back end thereof forming a horizontal transporting path and this path bends upward in an ark shape from the back end to the middle portion of the path. The middle portion of the path forms a vertical transporting path and this path bends forward in an arc shape from the middle portion to the front end. The front end forms a horizontal transporting path. The above bypass ascending transporting path 71 is provided with rollers and guides (not shown) driven by a driving portion not shown.

In the above transporting path connecting apparatus 6, the recording paper sheet P delivered from the horizontal eject transporting path 52 of the color image recording apparatus 1 is transported forward horizontally over a small distance by the back end of the bypass ascending transporting path 71, thereafter, transported upward from a lower position by the middle portion of the bypass ascending transporting path 71, and transported further forward horizontally over a small distance by the front end of the bypass ascending transporting path 71.

The bypass transporting path apparatus 5 in FIG. 15 will be described. The bypass transporting path apparatus 5 is attached to the monochrome image recording apparatus 2 with covering thereover from the front portion to the upper portion of the monochrome image recording apparatus 2. The bypass transporting path apparatus 5 transports the recording paper sheet P delivered from the bypass ascending transporting path 71 of the transporting path connecting apparatus 6 to the final processing apparatus 3. The bypass transporting path apparatus 5 also transports the recoding paper sheet P ejected and delivered from the horizontal eject transporting path 152 of the monochrome image recording apparatus 2 to the final processing apparatus 3.

Therefore, the bypass transporting path apparatus 5 is provided with a bypass horizontal transporting path 72, a bypass descending transporting path 73, a rear main transporting path 74, and a front main transporting path 75. The back end of the bypass horizontal transporting path 72 is connected with the front end of the bypass ascending transporting path 71 of the transporting path connecting apparatus 6. The front end of the bypass horizontal transporting path 72 is connected with the upper end of the bypass descending transporting path 73. The lower end of the bypass descending transporting path 73 joins and is connected with a main transporting path joining middle portion 76 that is a connecting portion of the rear main transporting path 74 and the front main transporting path 75. The rear end of the front main transporting path 75 is connected with the front end of the horizontal eject transporting path 152 of the monochrome image recording apparatus 2. Each of the above bypass horizontal transporting path 72, the bypass descending transporting path 73, the rear main transporting path 74, and the front main transporting path 75 is provided with rollers and guides (not shown) driven by a driving portion not shown.

In the above bypass transporting path apparatus 5, the recording paper sheet P delivered by the bypass ascending transporting path 71 of the transporting path connecting apparatus 6 to the bypass horizontal transporting path 72 is transported forward horizontally by the bypass horizontal transporting path 72, is transported vertically downward by the bypass descending transporting path 73, is delivered to the front main transporting path 75 in the main transporting path joining middle portion 76, is transported forward horizontally by the front main transporting path 75, and is delivered to the final processing apparatus 3. While, the recording paper sheet P delivered from the horizontal eject transporting path 152 of the monochrome image recording apparatus 2 to the rear main transporting path 74 is also transported forward horizontally by the front main transporting path 75 and is delivered to the final processing apparatus 3.

An upper containing transporting path 78 and an upper containing tray 77 are provided above the bypass transporting path 5 described above. The upper containing transporting path 78 is provided such that the path 78 branches from the bypass horizontal transporting path 72. The path 78 receives, by the switching of a transporting path switching lever 79, the recording paper sheet P transported by the bypass horizontal transporting path 72 and transports the sheet P to contain the sheet P in the upper containing tray 77. The upper containing tray 77 is provided as a recording paper sheet containing tray dedicated to the color image recording apparatus 1 to enable the recording paper sheet P recorded in the color image recording apparatus 1 to be received and contained on the way to the final processing apparatus 3 without transporting the sheet P thereto. The final processing apparatus 3 in FIG. 15 is the same as that in FIG. 3.

Referring to FIG. 15, the example of another configuration of the present system has been described. However, as shown in FIG. 16, the control in the present system is basically same as that described referring to FIGS. 5 to 14 and, therefore, the detailed description thereof is omitted. However, like the difference between FIG. 3 and FIG. 15, in the example of FIG. 16, the disposition of the color image recording apparatus 1 and the monochrome image recording apparatus 2 is inversed.

For example, the color-side controlling portion in FIG. 16 is provided with the color-side ICU 1*b* and the color-side PCU 1*c* as the color-side main controlling portion 1*a*, and comprises the color-side main controlling portion 1*a*, the color-side OCU 4*b* having the color-side operating panel, the color-side HDD 1*d*, and the color-side management portion 1*e*. The monochrome-side controlling portion is provided with the monochrome-side ICU 2*b* and the monochrome-side PCU 2*c* as the monochrome-side main controlling portion 2*a*, and comprises the monochrome-side main controlling portion 2*a*, the monochrome-side OCU 5*a* having the monochrome-side operating panel, the monochrome-side HDD 2*d*, and the monochrome-side management portion 2*e*.

The same points are that the color-side ICU 1*b* executes processing concerning color image data processed in the color image recording apparatus 1, and that the monochrome-side ICU 2*b* executes processing concerning monochrome image data processed in the monochrome image recording apparatus 2. However, the present system may be adapted such that the monochrome-side ICU 2*b* does not execute the control concerning the color scanner 4*a* including the processing of the color image data read by the color scanner 4*a* in the color image reading apparatus 4, and the color-side ICU 1*b* alone executes this control.

The sub-CPU 3*a* in the final-processing-side controlling portion executes the control of the final processing apparatus 3. The final-processing-side controlling portion does not need to be provided with any OCU. As the information on the operation instructions to the final processing apparatus 3, information from the color-side OCU 4*b* of the color-side controlling portion or the monochrome-side OCU 5*a* of the monochrome-side controlling portion may be used.

The controlling functions necessary for the image recording system of the present invention such as switching and recovering that are provided to the above color-side main controlling portion 1*a* and/or monochrome-side main controlling portion 2*a*, or controlling portion in another housing such as the transporting path connecting apparatus 6 are same as described referring to FIGS. 5 to 14 and the description thereof is omitted. However, due to the exchange of the length of the transporting path of the monochrome image recording apparatus 2 with that of the color image recording apparatus 1, the time to arrival of a recorded item differs. Therefore, the criterion in the process switching portion and the process recovering portion, and the predetermined conditions in the switching determining portion and the recovery determining portion differ accordingly.

The present invention can employ the form of the various programs described above embodiments. These programs may be distributed through a computer-readable recording medium or a network. Typical recording medium storing the programs and data to realize the functions of the present invention can be assumed specifically to be various types of CDs, MOs (Magneto-Optical disks), DVDs, FDs, flash memories, and in addition, various types of ROMs, RAMs, etc. A recording medium as above is set in the image recording system and the programs are transferred to and stored in the inside of the system. Otherwise, a recording medium as above is set in a general-purpose computer and the programs are transferred to and stored in the inside of the image recording system. And the image recording system reads the programs when necessary and, thereby, the functions according to the present invention can be realized.

As above, according to the present invention, two image recording apparatuses each capable of recording images independently are provided and, by switching between those apparatuses properly, improvement of FCOT can be facilitated and, when an image recording process can not be continued temporarily or until repairing is completed, substitute printing therefor can be executed.

The invention claimed is:

1. An image recording system, comprising:

a first image recording apparatus;

a second image recording apparatus disposed horizontally adjacent to the first image recording apparatus, each image recording apparatus capable of recording images independently;

a common recorded item containing portion that contains a recorded item outputted from the first image recording apparatus and a recorded item outputted from the second image recording apparatus, the common recorded item containing portion being disposed horizontally adjacent to the first image recording apparatus;

a process switching portion that switches an image recording process executed by one image recording apparatus to a substitute image recording process of the other image recording apparatus; and a switching determining portion that determines whether the switching is executed by the process switching portion, based on an evaluation of whether a predetermined condition is satisfied.

2. The image recording system of claim 1, wherein one of the first image recording apparatus and the second image recording apparatus is a color image recording apparatus including a monochrome image recording function, and the other image recording apparatus is a monochrome image recording apparatus.

3. The image recording system of claim 1, wherein the switching determining portion evaluates a condition that the recorded item from the image recording apparatus executing the image recording process arrives at the common recorded item containing portion later than the recorded item from the other image recording apparatus.

4. The image recording system of claim 3, wherein the switching determining portion evaluates a condition that recording in one image recording apparatus is able to be continued.

5. The image recording system of claim 1, wherein the switching determining portion evaluates a condition that an item which cannot be recorded on one image recording apparatus is guaranteed to be recorded in said other image recording apparatus.

6. The image recording system of claim 5, wherein the guarantee of the recording of said item includes verification that a recording material necessary for recording said item in the other image recording apparatus is able to be supplied to said other image recording apparatus.

7. The image recording system of claim 5, wherein the guarantee of the recording of said item includes verification that stable operation is able to be guaranteed in said other image recording apparatus.

8. The image recording system of claim 1, wherein the switching determining portion evaluates a condition that other print jobs are not in a stagnation situation in said other image recording apparatus.

9. The image recording system of claim 1, further comprising:

a process recovering portion that recovers the image recording process from the substitute image recording process in said other image recording apparatus after the process switching portion executes the switching; and a recovery determining portion that determines whether the recovery is executed by the process recovering portion, depending on whether a predetermined condition is satisfied.

10. The image recording system of claim 9, wherein the predetermined condition in the recovery determining portion includes a condition that the recorded item from the image recording apparatus executing the image recording process arrives at the recorded item containing portion faster than the substitute image recording process of the other image recording apparatus.

11. The image recording system of claim 9, wherein the predetermined condition in the recovery determining portion includes a condition that the output of the same recorded item is able to be guaranteed in the image recording apparatus executing the image recording process.

12. The image recording system of claim 11, wherein the guarantee of the output of the same recorded item in the recovery determining portion includes that a recording material necessary for the image recording is also able to be supplied to the image recording apparatus executing the image recording process in the same way.

13. The image recording system of claim 11, wherein the guarantee of the output of the same recorded item in the recovery determining portion includes that stable operation is able to be guaranteed in the image recording apparatus executing the image recording process.

14. The image recording system of claim 9, further comprising:

a sheet-number detecting portion that detects a number of sheets to be processed with the image recording process, wherein the recovery determining portion obtains a number of remaining sheets to be processed based on the number of sheets detected by the sheet-number detecting portion, and the predetermined condition in the recovery determining portion includes a condition that the number of remaining sheets to be processed is equal to or greater than a predetermined number of sheets.

15. The image recording system of claim 1, wherein a controlling portion of the first image recording apparatus acts as the process switching portion and the switching determining portion, or the process switching portion and the switching determining portion as well as a process recovering portion and a recovery determining portion, to control a controlling portion of the second image recording apparatus.

16. The image recording system of claim 1, wherein controlling portions of the both image recording apparatuses respectively include a monitoring portion that monitors the other image recording apparatus through a controlling portion of the other image recording apparatus, and the process switching portion and the switching determining portion, or the process switching portion and the switching determining portion as well as a process recovering portion and a recovery determining portion.

17. The image recording system of claim 1, comprising a common controlling portion incorporated into a housing disposed between the first image recording apparatus and the second image recording apparatus, the common controlling portion acting as the process switching portion and the switching determining portion, or the process switching portion and the switching determining portion as well as a process recovering portion and a recovery determining portion, to control both a controlling portion of the first image recording apparatus and a controlling portion of the second image recording apparatus.

18. A computer readable recording medium encoded with instructions, wherein the instructions when executed by a computer cause the computer to function as the controlling portion of the first image recording apparatus in the image recording system of claim 15.

19. A computer readable recording medium encoded with instructions, wherein the instructions when executed by a computer cause the computer to function as the controlling portions of both image recording apparatuses in the image recording system of claim 16.

20. A computer readable recording medium encoded with instructions, wherein the instructions when executed by a computer cause the computer to function as the common controlling portion in the image recording system of claim 17.

* * * * *